United States Patent
Choi et al.

(10) Patent No.: US 11,463,217 B2
(45) Date of Patent: Oct. 4, 2022

(54) METHOD FOR TRANSMITTING AND RECEIVING FEEDBACK INFORMATION AND VEHICLE THEREFOR

(71) Applicant: LG Electronics Inc., Seoul (KR)

(72) Inventors: Kukheon Choi, Seoul (KR); Ilmu Byun, Seoul (KR); Jiwon Kang, Seoul (KR); Kyuseok Kim, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 321 days.

(21) Appl. No.: 16/646,907

(22) PCT Filed: Sep. 27, 2018

(86) PCT No.: PCT/KR2018/011371
§ 371 (c)(1),
(2) Date: Mar. 12, 2020

(87) PCT Pub. No.: WO2019/059739
PCT Pub. Date: Mar. 28, 2019

(65) Prior Publication Data
US 2020/0304253 A1 Sep. 24, 2020

Related U.S. Application Data

(60) Provisional application No. 62/562,475, filed on Sep. 24, 2017.

(51) Int. Cl.
*H04B 7/024* (2017.01)
*H04B 7/06* (2006.01)
(Continued)

(52) U.S. Cl.
CPC ............. *H04L 5/005* (2013.01); *H04B 7/024* (2013.01); *H04B 7/0417* (2013.01); *H04B 7/0617* (2013.01); *H04W 8/005* (2013.01)

(58) Field of Classification Search
CPC .......... H04B 7/02–0417; H04B 7/0617; H04L 5/0048; H04L 5/005; H04L 5/0051; H04W 8/005; H04W 8/02; H04W 8/08
See application file for complete search history.

(56) References Cited

U.S. PATENT DOCUMENTS 9,154,267 B2 * 10/2015 He ...................... H04W 52/383
2015/0092689 A1 * 4/2015 Ko ....................... H04L 5/0048
370/329

(Continued)

FOREIGN PATENT DOCUMENTS

WO 2014178662 A1 11/2014
WO 2016018094 A1 2/2016

OTHER PUBLICATIONS

Sharp, "Consideration on SRS design for LTE-A UL multi-antenna transmission", 3GPP TSG RAN WG1 Meeting #58bis, Oct. 12-16, 2009, R1-094028.

(Continued)

*Primary Examiner* — Benjamin H Elliott, IV
*Assistant Examiner* — Prince A Mensah
(74) *Attorney, Agent, or Firm* — Dentons US LLP

(57) ABSTRACT

A method for receiving feedback information by a first moving object may comprise the steps of: transmitting a sidelink sounding reference signal (SRS) to a second moving object through each of distributed transmit antennas; receiving, from the second moving object, feedback information including first information associated with the similarity in coherent time between each of distributed receive antennas of the second moving object; and setting a transmission period of the sidelink SRS on the basis of the feedback information.

18 Claims, 22 Drawing Sheets

(51) Int. Cl.
  *H04L 5/00* (2006.01)
  *H04B 7/0417* (2017.01)
  *H04W 8/00* (2009.01)

(56) References Cited

U.S. PATENT DOCUMENTS

2015/0188683 A1   7/2015  Zhang et al.
2020/0076483 A1*  3/2020  Zhang ................. H04L 25/0398

OTHER PUBLICATIONS

Huawei, HiSilicon, "UL SRS design for beam management and CSI acquisition", 3GPP TSG RAN WG1 Meeting #90, Aug. 21-25, 2017, R1-1712238.

* cited by examiner (a) Tx and Rx vehicles move at distance (b) Tx and Rx vehicles move side by side (c) Driving directions of Tx and Rx vehicles are quite different from each other (at intersection)

(b) Driving directions of Tx and Rx vehicles are completely different from each other (a) Angle between vehicle and scatterer depending on displacement of Rx (b) Relationship between beamwidth and coherent time

METHOD FOR TRANSMITTING AND RECEIVING FEEDBACK INFORMATION AND VEHICLE THEREFOR

This application is the National Stage filing under 35 U.S.C. 371 of International Application No. PCT/KR2018/011371, filed on Sep. 27, 2018, which claims the benefit of U.S. Provisional Application No. 62/562,475 filed on Sep. 24, 2017, the contents of which are all hereby incorporated by reference herein in their entirety.

TECHNICAL FIELD

The present disclosure relates to a wireless communication system, and more particularly, to a method for transmitting and receiving feedback information and vehicle therefor.

BACKGROUND ART

When a new radio access technology (RAT) system is introduced, as more and more communication devices require larger communication capacity, there is a need for improved mobile broadband communication as compared to existing RAT.

In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, New RAT will provide services considering enhanced mobile broadband communication (eMBB), massive MTC (mMTC), URLLC (Ultra-Reliable Low-Latency Communication), etc. In a next-generation 5G system, scenarios may be divided into Enhanced Mobile Broadband (eMBB)/Ultra-reliable Machine-Type Communications (uMTC)/Massive Machine-Type Communications (mMTC), etc. eMBB is a next-generation mobile communication scenario having high spectrum efficiency, high user experienced data rate, high peak data rate, etc., uMTC is a next-generation mobile communication scenario having ultra-reliability, ultra-low latency, ultra-high availability, etc. (e.g., V2X, emergency service, remote control), and mMTC is a next-generation mobile communication scenario having low cost, low energy, short packet, and massive connectivity (e.g., IoT).

DISCLOSURE

Technical Problem

An object of the present disclosure is to provide a method by which a first moving object transmits feedback information.

Another object of the present disclosure is to provide a method by which a first moving object receives feedback information.

Still another object of the present disclosure is to provide a first moving object for transmitting feedback information.

A further object of the present disclosure is to provide a first moving object for receiving feedback information.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of transmitting feedback information by a first moving object. The method may include: receiving sidelink sounding reference signals (SRSs) through individual distributed receive antennas from a second moving object; generating first information on similarity in coherent times between the individual distributed receive antennas by measuring the sidelink SRSs received through the individual distributed receive antennas; and transmitting the feedback information including the first information to the second moving object. The first information may include distributed receive antenna grouping information on grouping of distributed receive antennas having similarity in coherent times therebetween greater than or equal to a predetermined threshold. The method may further include generating, based on the measurement, second information on an SRS resource on which the highest quality SRS is transmitted and the number of distributed receive antennas corresponding to SRS resources having similarity in coherent times with the SRS resource greater than or equal to a predetermined threshold, and the feedback information may further include the second information. The method may further include generating, based on the measurement, third information on an SRS port and an SRS resource on which the highest quality SRS is transmitted and the number of distributed receive antennas having similarity in coherent times with the SRS port greater than or equal to a predetermined threshold, and the feedback information may further include the third information. The feedback information may further include information indicating that sidelink SRSs need to be transmitted with the same periodicity for the same distributed receive antenna group.

In another aspect of the present disclosure, provided herein is a method of receiving feedback information by a first moving object. The method may include: transmitting sidelink sounding reference signals (SRSs) through individual distributed transmit antennas to a second moving object; receiving, from the second moving object, feedback information including first information on similarity in coherent times between individual distributed receive antennas of the second moving object; and configuring transmission periodicities of the sidelink SRSs based on the feedback information. The first information may include distributed receive antenna grouping information on grouping of distributed receive antennas of the second moving object having similarity in coherent times greater than or equal to a predetermined threshold, and the configuring may include configuring the same SRS transmission periodicity for the same distributed receive antenna group. The configuring may further include configuring transmission periodicities for different receive antenna groups such that transmission intervals of the sidelink SRSs do not overlap with each other in a time domain.

In still another aspect of the present disclosure, provided herein is a first moving object for transmitting feedback information. The first moving object may include: a receiver configured to receive sidelink sounding reference signals (SRSs) through individual distributed receive antennas from a second moving object; a processor configured to generate first information on similarity in coherent times between the individual distributed receive antennas by measuring the sidelink SRSs received through the individual distributed receive antennas; and a transmitter configured to transmit the feedback information including the first information to the second moving object. The first information may include distributed receive antenna grouping information on grouping of distributed receive antennas having similarity in coherent times therebetween greater than or equal to a predetermined threshold. The processor may be configured to generate, based on the measurement, second information on an SRS resource on which the highest quality SRS is transmitted and the number of distributed receive antennas corresponding to SRS resources having similarity in coherent times with the SRS resource greater than or equal to a predetermined threshold, and the feedback information may further include the second information. The processor may be configured to generate, based on the measurement, third information on an SRS port and an SRS resource on which the highest quality SRS is transmitted and the number of distributed receive antennas having similarity in coherent times with the SRS port greater than or equal to a predetermined threshold, and the feedback information may further include the third information. The feedback information may further include information indicating that sidelink SRSs need to be transmitted with the same periodicity for the same distributed receive antenna group.

In a further aspect of the present disclosure, provided herein is a first moving object for receiving feedback information by a first moving object. The first moving object may include: a transmitter configured to transmit sidelink sounding reference signals (SRSs) through individual distributed transmit antennas to a second moving object; a receiver configured to receive, from the second moving object, feedback information including first information on similarity in coherent times between individual distributed receive antennas of the second moving object; and a processor configured to configure transmission periodicities of the sidelink SRSs based on the feedback information. The processor may be configured to configure transmission periodicities for different receive antenna groups such that transmission intervals of the sidelink SRSs do not overlap with each other in a time domain. The first moving object may include a vehicle with a distributed antenna deployment structure.

Advantageous Effects

According to the present disclosure, a reference signal (RS) transmission periodicity may be configured in consideration of different Doppler channel characteristics (i.e., a change in surrounding scatterers, a coherent time due to the Doppler effect, etc.) between transmission and reception links of individual distributed antennas in vehicle-to-vehicle (V2V) communication, thereby improving communication performance.

Effects obtainable from the present disclosure may be non-limited by the above mentioned effect. And, other unmentioned effects can be clearly understood from the following description by those having ordinary skill in the technical field to which the present disclosure pertains.

DESCRIPTION OF DRAWINGS

The accompanying drawings, which are included to provide a further understanding of the disclosure, illustrate embodiments of the disclosure and together with the description serve to explain the principle of the disclosure.

BEST MODE

Figure 1:
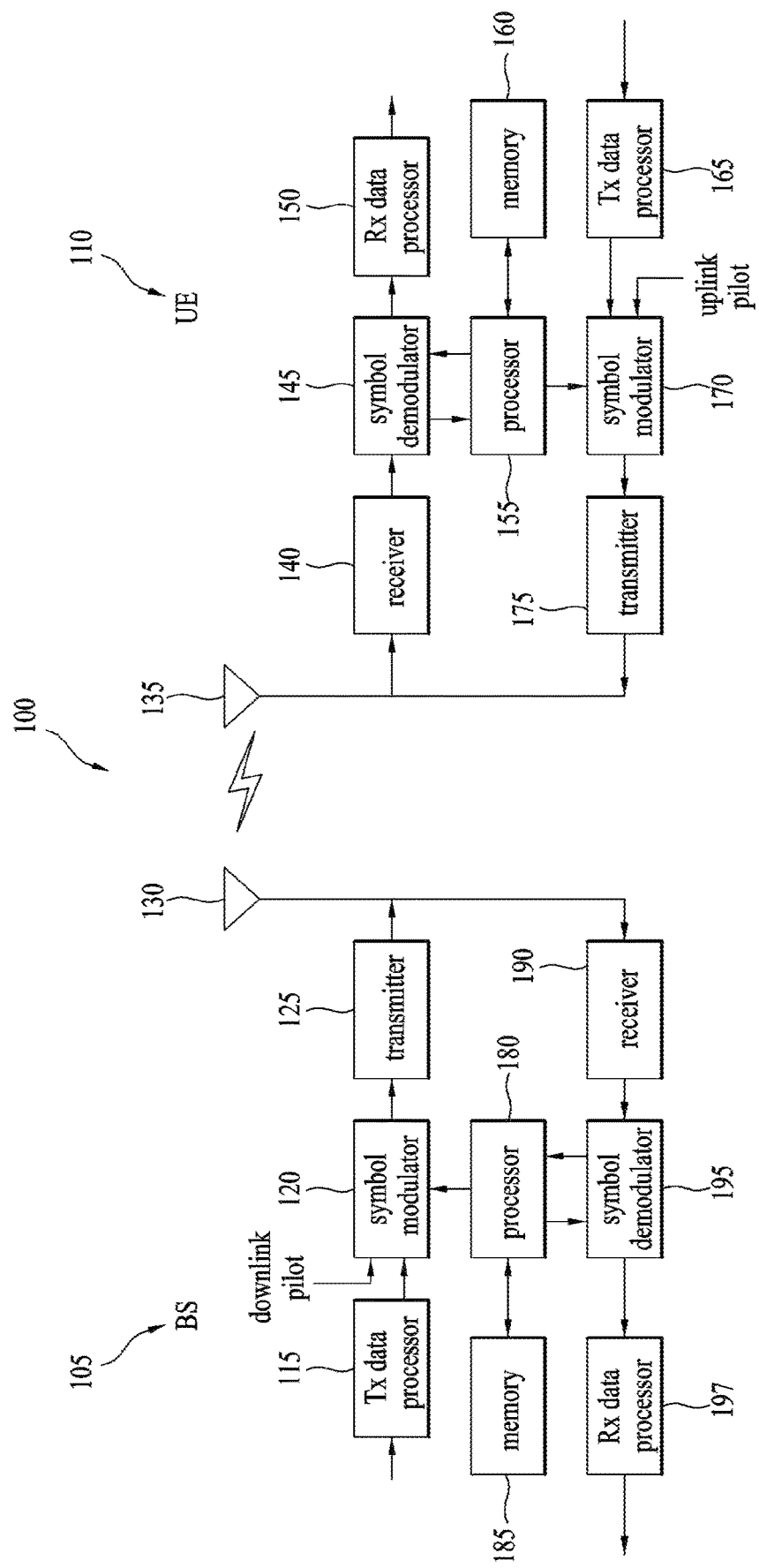
FIG. 1 is a block diagram showing the configurations of a base station (BS) 105 and a user equipment (UE) 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP), gNode B and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

FIG. 2 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multiuser-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present disclosure is related to a method of configuring the transmission periodicity of a reference signal (RS) for channel estimation (e.g., a demodulation reference signal (DMRS)) or an RS for channel state information (CSI) acquisition (e.g., channel state information reference signal (CSI-RS), sounding reference signal (SRS), etc.) dynamically/semi-persistently/statically in consideration of coherent times on serving beam pair links when each transmission and reception beamwidth is determined based on different Doppler channel characteristics (e.g., a change in surrounding scatterers, a coherent time due to the Doppler effect, etc.) between transmission and reception links of individual distributed antennas in vehicle-to-vehicle (V2V) communication. In addition, the present disclosure is directed to a method of transmitting feedback on capability information (coherent time, coherent bandwidth (BW), etc.) required for transmission of each RS and a method of configuring an RS transmission periodicity based on the feedback.

In the present disclosure, the aforementioned coherent time is taken as an example of an index or value for representing similarity between channel states (or related to the similarity between channel states). In addition, a transmitting vehicle is taken as an example of a moving transmitter, and a receiving vehicle is taken as an example of a moving receiver.

Analog Beamforming

In a Millimeter Wave (mmW) system, since a wavelength is short, a plurality of antennas can be installed in the same area. That is, considering that the wavelength in the 30 GHz band is 1 cm, a total of 64 (8×8) antenna elements can be installed in a 4 cm by 4 cm panel at intervals of 0.5 lambda (wavelength) in the case of a 2-dimensional array. Therefore, in the mmW system, it is attempted to improve the coverage or throughput by increasing the beamforming (BF) gain using multiple antenna elements.

In this case, if each antenna element includes a transceiver unit (TXRU) to enable adjustment of transmit power and phase per antenna element, each antenna element can perform independent beamforming per frequency resource. However, installing TXRUs in all of the about 100 antenna elements is less feasible in terms of cost. Therefore, a method of mapping a plurality of antenna elements to one TXRU and adjusting the direction of a beam using an analog phase shifter has been considered. However, such an analog beamforming method is disadvantageous in that frequency selective beaming is impossible because only one beam direction is generated over the full band.

As an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 2A:
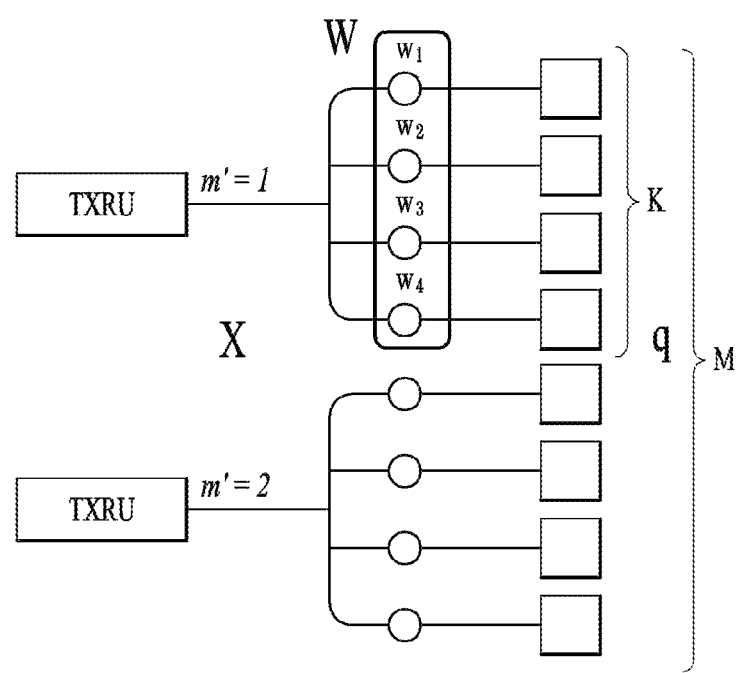
FIG. 2a is a diagram illustrating TXRU virtualization model option 1 (sub-array model)
Figure 2B:
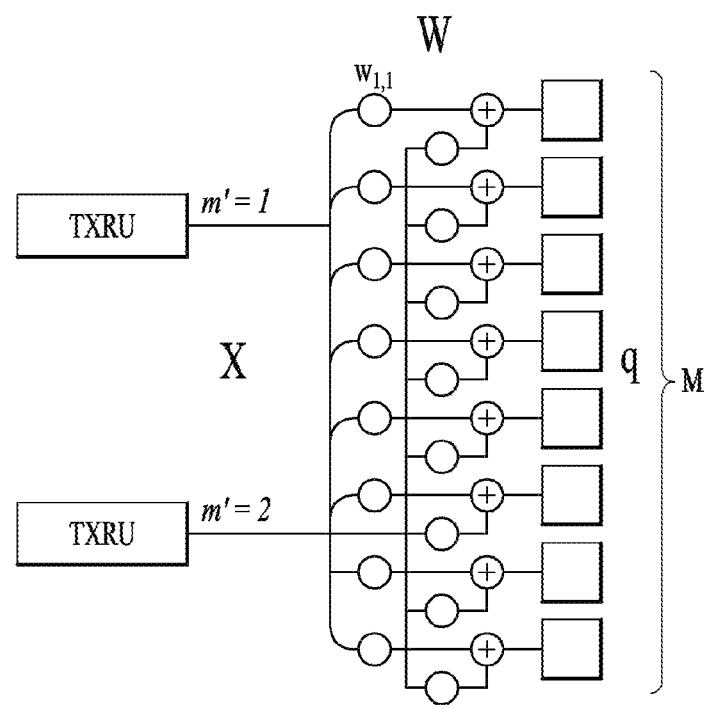
FIG. 2b is a diagram illustrating TXRU virtualization model option 2 (full connection model).

FIG. 2a is a view showing TXRU virtualization model option 1 (sub-array model) and FIG. 2b is a view showing TXRU virtualization model option 2 (full connection model).

FIGS. 2a and 2b show representative examples of a method of connecting TXRUs and antenna elements. Here, the TXRU virtualization model shows a relationship between TXRU output signals and antenna element output signals. FIG. 2a shows a method of connecting TXRUs to sub-arrays. In this case, one antenna element is connected to one TXRU. In contrast, FIG. 2b shows a method of connecting all TXRUs to all antenna elements. In this case, all antenna elements are connected to all TXRUs. In FIGS. 2a and 2b, W indicates a phase vector weighted by an analog phase shifter. That is, W is a major parameter determining the direction of the analog beamforming. In this case, the mapping relationship between CSI-RS antenna ports and TXRUs may be 1-to-1 or 1-to-many.

Hybrid Beamforming

Figure 3:
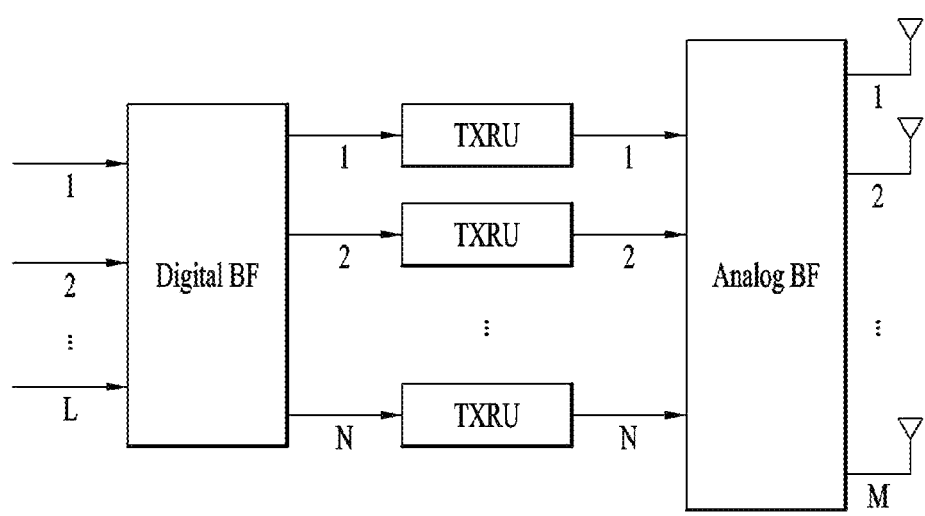
FIG. 3 is a block diagram of hybrid beamforming.

FIG. 3 is a block diagram for hybrid beamforming.

Figure 4:
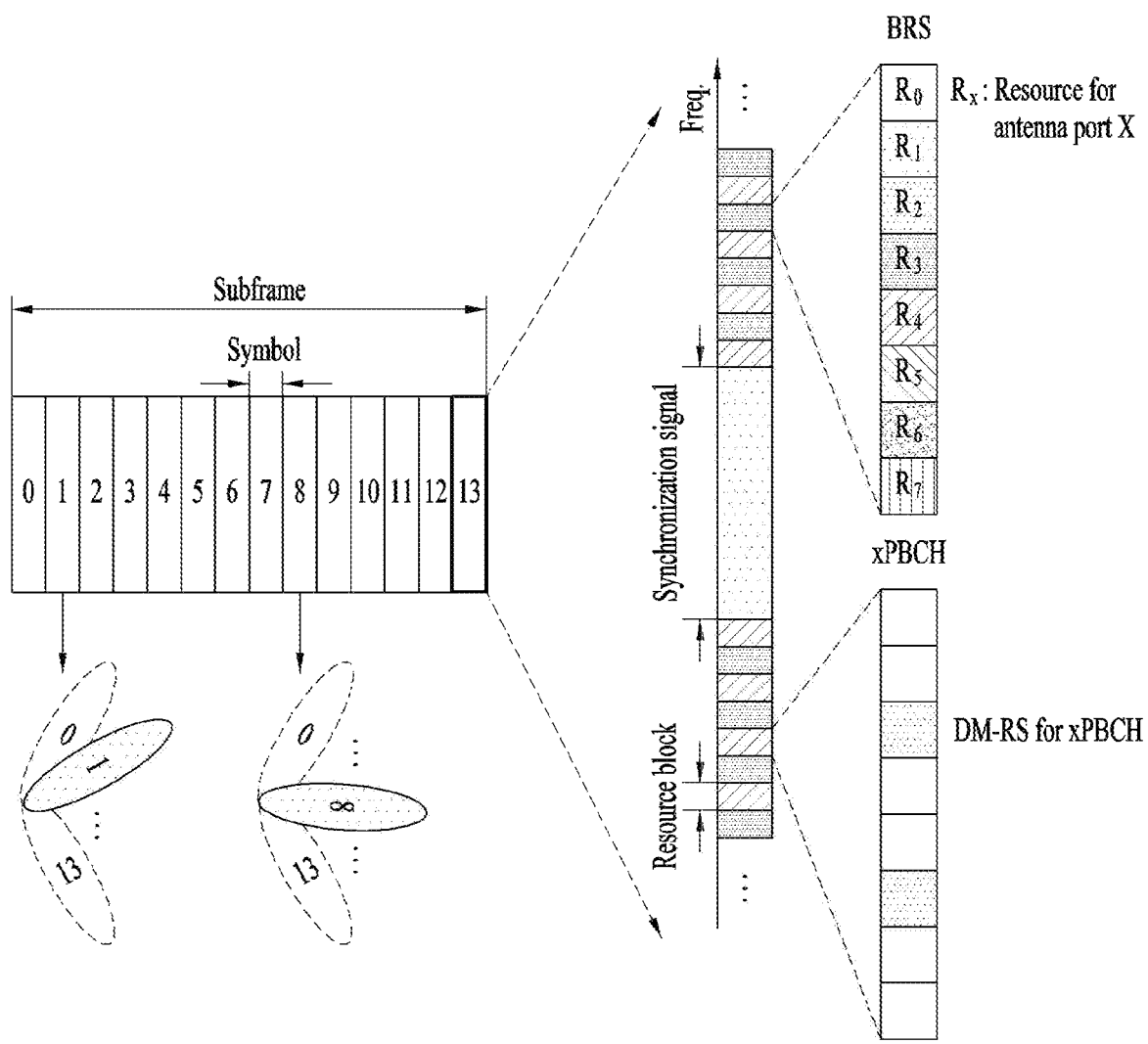
FIG. 4 is a diagram illustrating beams mapped to BRS symbols in hybrid beamforming.

If a plurality of antennas is used in a new RAT system, a hybrid beamforming scheme which is a combination of digital beamforming and analog beamforming may be used. At this time, analog beamforming (or RF beamforming) means operation of performing precoding (or combining) at an RF stage. In the hybrid beamforming scheme, each of a baseband stage and an RF stage uses a precoding (or combining) method, thereby reducing the number of RF chains and the number of D/A (or A/D) converters and obtaining performance similar to performance of digital beamforming. For convenience of description, as shown in FIG. 4, the hybrid beamforming structure may be expressed by N transceivers (TXRUs) and M physical antennas. Digital beamforming for L data layers to be transmitted by a transmission side may be expressed by an N·L matrix, N digital signals are converted into analog signals through TXRUs and then analog beamforming expressed by an M·N matrix is applied.

FIG. 3 shows a hybrid beamforming structure in terms of the TXRUs and physical antennas. At this time, in FIG. 3, the number of digital beams is L and the number of analog beams is N. Further, in the new RAT system, a BS is designed to change analog beamforming in symbol units, thereby supporting more efficient beamforming for a UE located in a specific region. Furthermore, in FIG. 3, when N TXRUs and M RF antennas are defined as one antenna panel, up to a method of introducing a plurality of antenna panels, to which independent hybrid beamforming is applicable, is being considered in the new RAT system.

When the BS uses a plurality of analog beams, since an analog beam which is advantageous for signal reception may differ between UEs, the BS may consider beam sweeping operation in which the plurality of analog beams, which will be applied by the BS in a specific subframe (SF), is changed according to symbol with respect to at least synchronization signals, system information, paging, etc. such that all UEs have reception opportunities.

FIG. 4 is a view showing an example of beams mapped to BRS symbols in hybrid beamforming.

FIG. 4 shows the beam sweeping operation with respect to synchronization signals and system information in a downlink (DL) transmission procedure. In FIG. 4, a physical resource (or physical channel) through which the system information of the new RAT system is transmitted in a broadcast manner is named xPBCH (physical broadcast channel). At this time, analog beams belonging to different antenna panels may be simultaneously transmitted within one symbol, and, in order to measure a channel per analog beam, as shown in FIG. 4, a method of introducing a beam reference signal (BRS) which is an RS transmitted by applying a single analog beam (corresponding to a specific analog panel) may be considered. The BRS may be defined with respect to a plurality of antenna ports and each antenna port of the BRS may correspond to a single analog beam. Although the RS used to measure the beam is given BRS in FIG. 5, the RS used to measure the beam may be named another name. At this time, unlike the BRS, a synchronization signal or xPBCH may be transmitted by applying all analog beams of an analog beam group, such that an arbitrary UE properly receives the synchronization signal or xPBCH.

Figure 5:
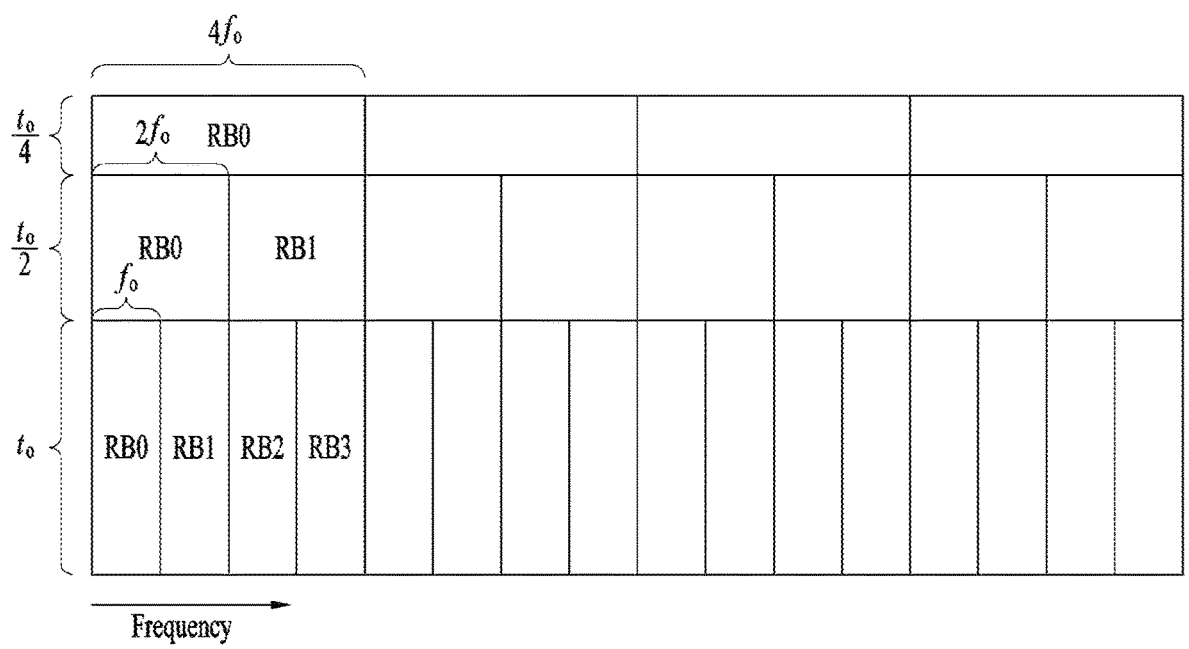
FIG. 5 is a diagram illustrating symbol/sub-symbol alignment between different numerologies.

FIG. 5 is a view showing symbol/sub-symbol alignment between different numerologies.

Features of New RAT (NR) Numerology

In the NR system, a method of supporting a scalable numerology is considered. Specifically, in the NR system, the subcarrier spacing is expressed as (2n×15) kHz, where n is an integer. From the nested perspective, a subset or a superset (at least 15, 30, 60, 120, 240, and 480 kHz) is considered as the main subcarrier spacing. The symbol or sub-symbol alignment between different numerologies may be supported by adjusting the numerologies to have the same CP overhead rate.

In addition, a numerology may be determined by dynamically allocating time/frequency granularity depending on services (eMBB, URLLC, mMTC, etc.) and scenarios (high speed, etc.).

The main agreements made in the NR are summarized as follows.

The maximum bandwidth allocated per NR carrier is 400 MHz.

Details of up to 100 MHz bandwidth are specified in Rel-15.

The scalable numerology is adopted. That is, 15 kHz*(2$^n$) (15 to 480 kHz) is used.

One numerology has one subcarrier spacing (SCS) and one cyclic prefix (CP). Each SCS and CP are configured by RRC.

A subframe has a fixed length of 1 ms (a transmission time interval (TTI) corresponds to a slot (14 symbols), a mini-slot (in the case of URLLC), or a multi-slot depending on the SCS or purpose (e.g., URLLC), and the TTI is also configured by RRC signaling (one TTI duration determines how transmission is made on physical layer).

All numerologies are aligned every 1 ms.

The number of subcarriers in each RB is fixed to 12.

The number of symbols in a slot is 7 or 14 (in the case of an SCS lower than 60 kHz) and 14 (in the case of an SCS higher than 60 kHz).

The characteristics of SRS hopping in the LTE system are summarized as follows.

SRS hopping is performed only in the case of periodic SRS triggering (i.e., triggering type 0).

SRS resource allocation is given by a predefined hopping pattern.

A hopping pattern may be UE-specifically configured through RRC signaling (however, overlapping is not allowed).

The SRS may be frequency hopped and transmitted by applying a hopping pattern to each subframe where a cell/UE-specific SRS is transmitted.

The SRS frequency-domain starting location and hopping equation are defined by Equation 1.

$$k_0^{(p)} = \bar{k}_0^{(p)} + \sum_{b=0}^{B_{SRS}} K_{TC} M_{sc,b}^{RS} n_b \qquad \text{[Equation 1]}$$

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

$$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \lfloor n_{SRS}/\prod_{b'=b_{hop}}^{b-1} N_{b'} \rfloor & \text{if } N_b \text{ odd} \end{cases}$$

$$n_{SRS} = \begin{cases} 2N_{SP} n_f + 2(N_{SP}-1)\left\lfloor \dfrac{n_s}{10} \right\rfloor + \left\lfloor \dfrac{T_{offset}}{T_{offset\_max}} \right\rfloor, & \text{for 2 ms SRS periodicity of frame structure type 2} \\ \lfloor (n_f \times 10 + \lfloor n_s/2 \rfloor)/T_{SRS} \rfloor, & \text{otherwise} \end{cases}$$

In Equation 1, $n_{SRS}$ denotes a hopping interval in the time domain, $N_b$ denotes the number of branches allocated to a tree level b, and b may be determined by setting $B_{SRS}$ in dedicated RRC.

Figure 6:
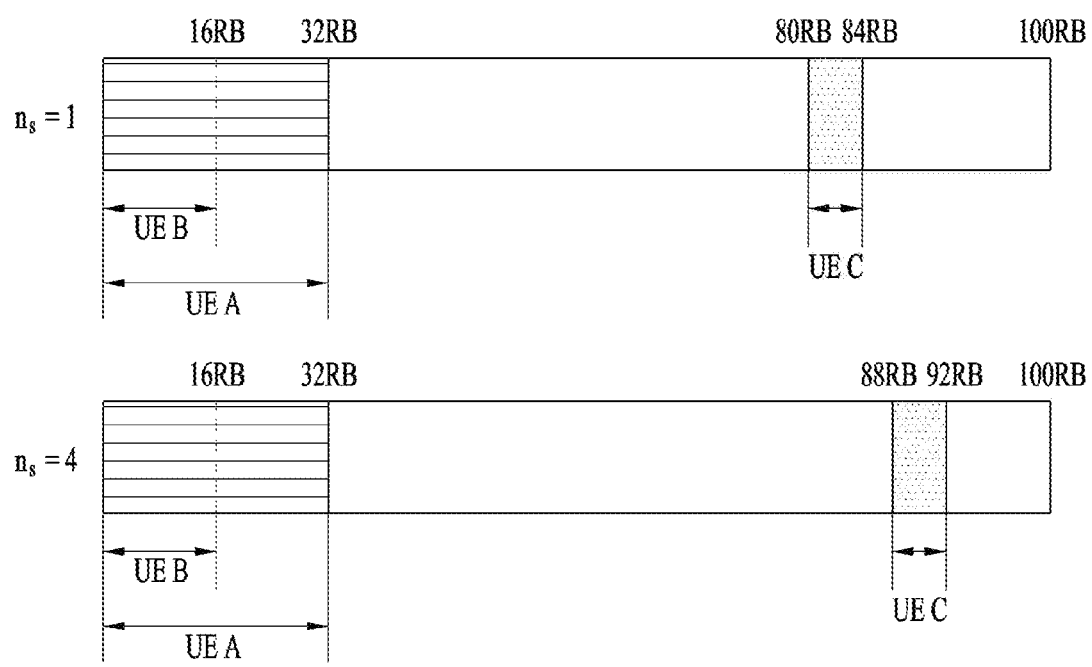
FIG. 6 is a diagram illustrating an LTE hopping pattern (ns=1→ns=4).

FIG. 6 is a diagram illustrating an LTE hopping pattern ($n_s=1 \rightarrow n_s=4$).

Hereinafter, an example of configuring an LTE hopping pattern will be described.

LTE hopping pattern parameters may be set through cell-specific RRC signaling. For example, $C_{SRS}=1$, $N_{RB}^{UL}=100$, $n_f=1$, $n_s=1$ may be set.

Next, LTE hopping pattern parameters may be set through UE-specific RRC signaling. For example, UE A: $B_{SRS}=1$, $b_{hop}=0$, $n_{RRC}=22$, $T_{SRS}=10$
UE B: $B_{SRS}=2$, $b_{hop}=0$, $n_{RRC}=10$, $T_{SRS}=5$
UE C: $B_{SRS}=3$, $b_{hop}=2$, $n_{RRC}=23$, $T_{SRS}=2$ may be set.

(SRS) Space Division Duplex for V2X

The space division duplex (or space division communication) according to the present disclosure refers to a method of managing a communication link independently for each antenna by space-division of individual antennas of a UE. To manage the communication link independently for each antenna, self-interference between the antennas of the UE needs to be cancelled, and inter-UE interference, which exists in the communication link, should also be reduced. To eliminate the self-interference between the antennas of the UE, an analog or digital self-interference cancellation scheme may be applied. Alternatively, the self-interference may be eliminated by increasing a distance between antennas. The scheme of increasing a distance between antennas for self-interference cancellation has low complexity compared to the analog or digital self-interference cancellation scheme, and thus, it may be easily applied to systems. The scheme of increasing a distance between antennas for self-interference cancellation may be more easily applied to a vehicle UE, which is larger than a communication UE, since it is easier to increase a distance between antennas. To reduce the inter-UE interference, an inter-cell interference scheme of the conventional cellular communication system may be applied. In the current cellular communication using an ultra-high frequency band above 6 GHz, a narrow beamwidth is used to secure a communication distance. Thus, interference due to beam overlap between neighboring cells is expected to occur less frequently. A signal is likely to be blocked by an object due to the linearity of a signal. Since a vehicle is made of iron and has a relatively large size, the vehicle is expected to block a high-frequency signal from a neighboring UE.

Due to the above-described features, the space division communication is easily applicable to high-frequency communication between vehicles with distributed antennas. In the space division communication, since antenna links are isolated from each other, different transmission and reception times may be assigned to each communication link, and frequency resources may be reused in each communication link.

Figure 7:
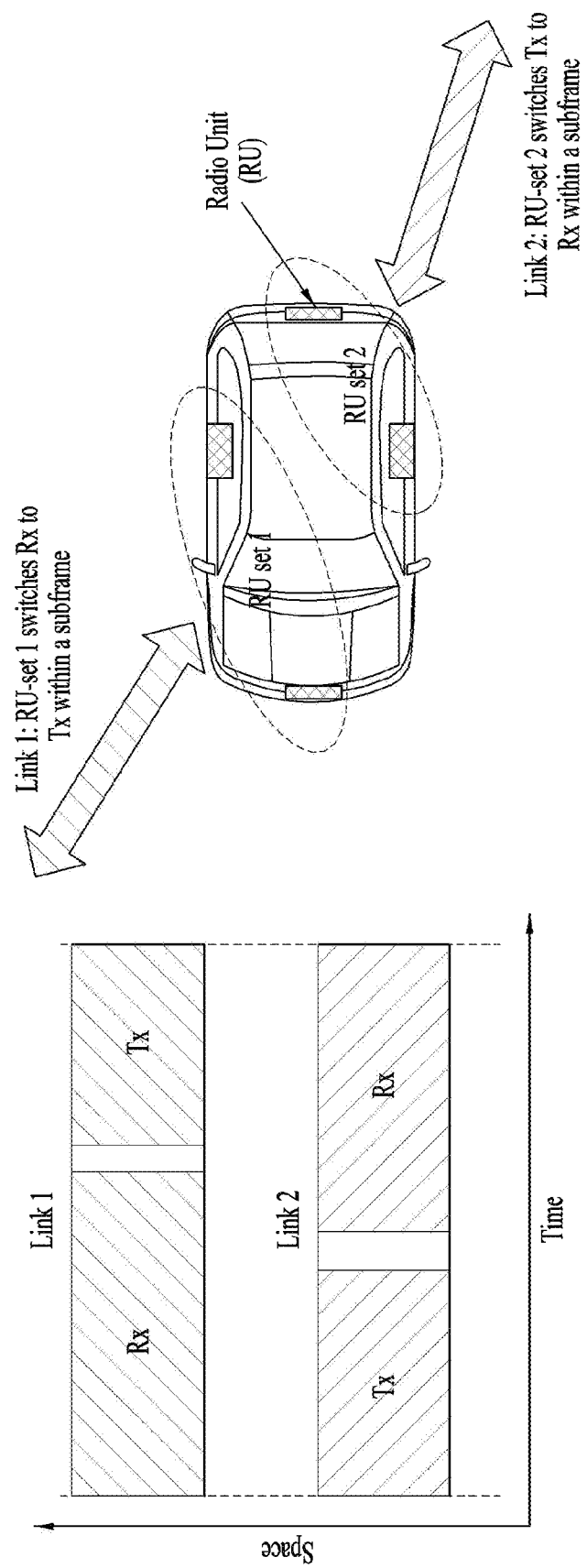
FIG. 7 is a diagram illustrating an example of applying spatial division communication (SDD) to a vehicle with distributed antennas.

FIG. 7 is a diagram illustrating application of a spatial division communication (SDD) in a vehicle to which distributed antennas are applied.

In FIG. 7, link 1 and link 2 are communication links connected with different devices (UE or base station). The amount of Tx resources and Rx resources may be changed depending on a status of each communication link, and Tx timing point and Rx timing point may also be changed. A radio unit (RU) shown in FIG. 7 is an antenna module that includes a plurality of antennas. In this case, a UE includes four RUs which are distributed. Two of four RUs are used to form link 1, and the other two RUs are used to form link 2.

In the case that SDD is applied to a plurality of UEs, it is advantageous that transmission may be performed using more resources for more several times within a target time than the case that SDD is not applied to a plurality of UEs.

Figure 8:
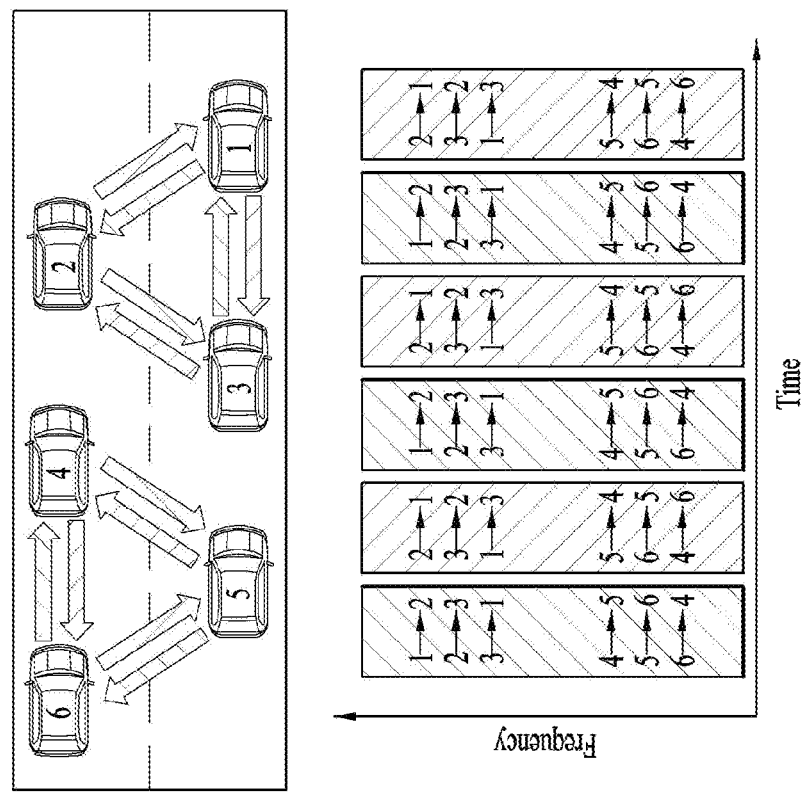
FIG. 8 is a diagram illustrating a comparison between a case in which SDD is applied and a case in which no SDD is applied.
Figure 8:
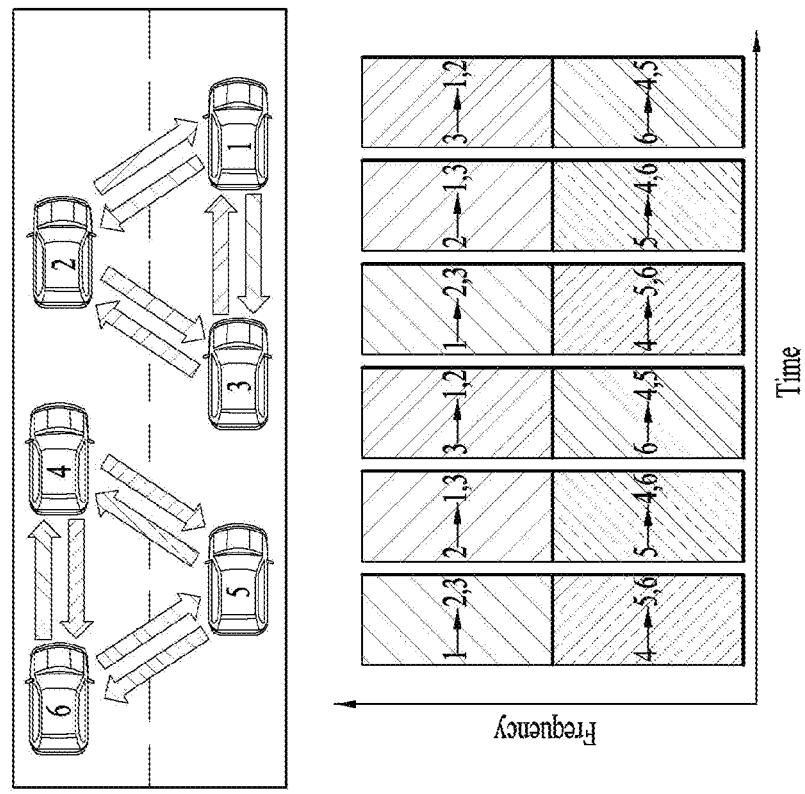

FIG. 8 illustrates a comparison example of a case that SDD is not applied and a case that SDD is applied.

Referring to FIG. 8, a left drawing illustrates communication between vehicles to which SDD is not applied, and a right drawing illustrates communication between vehicles to which SDD is applied. In the case that SDD is not applied, the UE transmits a signal to different UEs in accordance with a multiplexing mode at the same time. If three UEs intend to form a communication link with their neighboring UE as shown in FIG. 8, each UE should be allocated with one transmission resource and two reception resources. If SDD is applied, the UE has only to form one transmission resource and one reception resource per communication link, the UE may perform signal transmission within a unit time for more times than the case that SDD is not applied. If SDD is applied, frequency resources are divisionally allocated to neighboring UEs that transmit signals simultaneously with the corresponding UE. If SDD is applied, since transmission signals of the respective UEs are spatially divided, the same frequency resource may be used, whereby frequency resources used by each communication link are increased.

In addition to the aforementioned advantages, since a reception UE of each communication link receives a signal by using narrow reception beams for space division, it is not likely that the UE is affected by jamming. Also, a neighboring vehicle is likely to block the signal, it is difficult to perform jamming at a long distance. As additional advantage, since a base station does not need to manage resources between communication groups to be orthogonal to resources in the communication groups, complexity in resource management of the base station is reduced.

Figure 9:
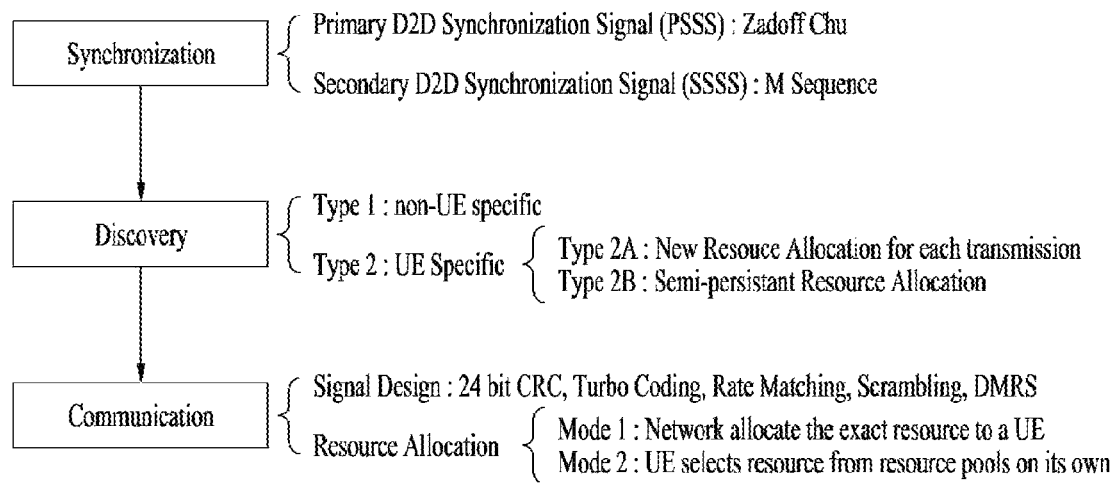
FIG. 9 is a diagram illustrating a procedure for a sidelink connection.

FIG. 9 is a diagram illustrating a procedure for a sidelink connection.

As a direct link between UEs, a sidelink is used for communication between the UEs. A UE may perform synchronization for the sidelink connection, perform discovery to discover a neighboring UE to communicate with, and perform communication with the neighboring UE.

Table 1 below shows a sidelink DMRS in the LTE (LTE-A) system.

TABLE 1

Demodulation reference signals associated with PSSCH, PSCCH, PSDCH, and PSBCH transmission shall be transmitted according to PUSCH in clause 5.5.2.1 with the following exceptions:
　The parameters in Tables 9.8-1, 9.8-2, and 9.8-3 shall be used.
　The term PUSCH shall be replaced by PSSCH, PSCCH, PSDCH or PSBCH, depending on the physical channel to which the reference signal is associated.
　Antenna ports are given by Table 9.2-1.
　The set of physical resource blocks used in the mapping process shall be identical to the corresponding PSSCH/PSCCH/PSDCH/PSBCH transmission.
　The index k in the mapping process in clause 5.5.2.1.2 corresponding to the case where higher-layer parameter ul-DMRS-IFDMA is not set shall be identical to that for the corresponding PSSCH/PSCCH/PSDCH/PSBCH transmission.
　　For sidelink transmission modes 3 and 4 on the PSSCH and PSCCH, the mapping shall use l = 2 and l = 5 for the first slot in the subframe and l = 1 and l = 4 for the second slot in the subframe.
　　For sidelink transmission modes 3 and 4 on the PSBCH, the mapping shall use l = 4 and l = 6 for the first slot in the subframe and l = 2 for the second slot in the subframe.
　For sidelink transmission modes 1 and 2, the pseudo-random sequence generator in clause 5.5.1.3 shall be initialized at the start of each slot fulfilling $n_{ss}^{PSSCH} = 0$. For sidelink transmission modes 3 and 4 the pseudo-random sequence generator in clause 5.5.1.3 shall be initialized at the start of each slot fulfilling $n_{ss}^{PSSCH} \bmod 2 = 0$.
　For sidelink transmission modes 3 and 4 on the PSCCH, the cyclic shift $n_{cs,\lambda}$ to be applied for all DM-RS in a subframe shall be chosen according to clause 14.2.1 of [4].
　For sidelink transmission modes 1 and 2 and sidelink discovery, the quantity m in clause 5.5.2.1.1 takes the values m = 0, 1 and for sidelink transmission modes 3 and 4, the quantity m in clause 5.5.2.1.1 takes the values m = 0, 1, 2, 3 for PSSCH and m = 0, 1, 2 for PSBCH.
　For sidelink transmission modes 3 and 4, the quantity $n_{ID}^X$ equals the decimal representation of CRC on the PSCCH transmitted in the same subframe as the PSSCH according to $n_{ID}^X = \Sigma_{i=0}^{L-1} p_i \cdot 2^{L-1-i}$ with p and L given by clause 5.1.1 in [3].

TABLE 2

| Parameter in clause 5.5.2.1 | | Sidelink transmission modes 1 and 2 | Sidelink transmission modes 3 and 4 |
|---|---|---|---|
| Group hopping | $n_{ID}^{RS}$ $n_s$ | enabled $n_{ID}^{SA}$ $n_{ss}^{PSSCH}$ | enabled $n_{ID}^X$ $2n_{ss}^{PSSCH}$ first DM-RS symbol in a slot $2n_{ss}^{PSSCH} + 1$ second DM-RS symbol in a slot |
| | $f_{ss}$ | $n_{ID}^{SA} \bmod 30$ | $\lfloor n_{ID}^X/16 \rfloor \bmod 30$ |
| Sequence hopping | | disabled | disabled |
| Cyclic shift | $n_{cs,\lambda}$ | $\lfloor n_{ID}^{SA}/2 \rfloor \bmod 8$ | $\lfloor n_{ID}^X/2 \rfloor \bmod 8$ |
| Orthogonal sequence | $[w^\lambda(\cdot)]$ | $[+1\ +1]$ if $n_{ID}^{SA} \bmod 2 = 0$ $[+1\ -1]$ if $n_{ID}^{SA} \bmod 2 = 1$ | $[+1\ +1\ +1\ +1]$ if $n_{ID}^X \bmod 2 = 0$ $[+1\ -1\ +1\ -1]$ if $n_{ID}^X \bmod 2 = 1$ |
| Reference signal length | $M_{sc}^{RS}$ | $M_{sc}^{PSSCH}$ | $M_{sc}^{PSSCH}$ |
| Number of layers | $\upsilon$ | 1 | 1 |
| Number of antenna ports | P | 1 | 1 |

TABLE 3

| Parameter in clause 5.5.2.1 | | PSCCH | |
|---|---|---|---|
| | | Sidelink transmission modes 1 and 2 | Sidelink transmission modes 3 and 4 |
| Group hopping | | Disabled | disabled |
| | $n_{ID}^{RS}$ | — | — |
| | $n_s$ | — | — |
| | $f_{ss}$ | 0 | 8 |
| Sequence hopping | | Disabled | disabled |
| Cyclic shift | $n_{cs,\lambda}$ | 0 | {0, 3, 6, 9} |
| Orthogonal sequence | $\lfloor w^\lambda(\cdot) \rfloor$ | [+1 +1] | [+1 +1 +1 +1] |
| Reference signal length | $M_{sc}^{RS}$ | $M_{sc}^{PSCCH}$ | $M_{sc}^{PSCCH}$ |
| Number of layers | $\upsilon$ | 1 | 1 |
| Number of antenna ports | P | 1 | 1 |

TABLE 4

| Parameter in clause 5.5.2.1 | | PSDCH | PSSCH | |
|---|---|---|---|---|
| | | | Sidelink transmission modes 1 and 2 | Sidelink transmission modes 3 and 4 |
| Group hopping | | disabled | Disabled | disabled |
| | $f_{ss}$ | 0 | $\lfloor n_{ID}^{SL}/16 \rfloor \bmod 30$ | $\lfloor n_{ID}^{X}/16 \rfloor \bmod 30$ |
| Sequence hopping | | disabled | Disabled | disabled |
| Cyclic shift | $n_{cs,\lambda}$ | 0 | $\lfloor n_{ID}^{SL}/2 \rfloor \bmod 8$ | $\lfloor n_{ID}^{SL}/2 \rfloor \bmod 8$ |
| (Orthogonal sequence) | $\lfloor \ldots w^\lambda(m) \ldots \rfloor$ | [+1 +1] | [+1 +1] if $N_{ID}^{SL} \bmod 2 =$ [+1 -1] if $N_{ID}^{SL} \bmod 2 =$ | [+1 +1 +1] [+1 -1 +1] |
| Reference signal length | $M_{sc}^{RS}$ | $M_{sc}^{PSDCH}$ | $M_{sc}^{PSBCH}$ | $M_{sc}^{PSBCH}$ |
| Number of layers | $\upsilon$ | 1 | 1 | 1 |
| Number of antenna ports | P | 1 | 1 | 1 |

Relationship Between Beamwidth, Beam Steering Capability, and Doppler Effect of Vehicle (on Premise that Doppler Effect Decreases as Beamwidth Decreases and Each TRP has Directional Beam)

To understand small-scale fading among the characteristics of a V2V channel, it is important to figure out not only the displacement of scatterers in the vicinity of transmitting and receiving vehicles but also the characteristics of the relative Doppler effect between transmitting and receiving vehicles. In a millimeter wave (mmWave) band, since a directional antenna is used to obtain beamforming gain, it is important to understand a channel and variation therein caused by the use of the directional antenna. Hereinafter, the characteristics of a coherent time due to the relative Doppler effect including hardware characteristics (e.g., reception beam steering implementation) due to the use of the directional antenna will be described.

In general, when a directional antenna is used, a beamwidth at a receiving (Rx) end increases in proportional to the number of received Doppler-shifted rays. In other words, as the receive (Rx) beamwidth increases, the number of Doppler-shifted rays increases, and thus, delay spread increases. On the other hand, as the Rx beamwidth decreases, the number of received Doppler-shifted rays decreases, and thus the delay spread decreases.

Figure 10:
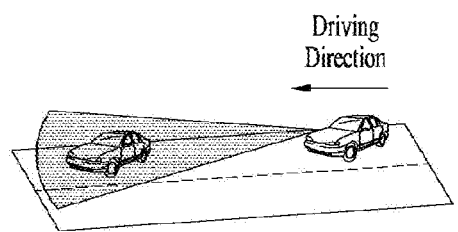
FIG. 10 is a diagram illustrating scenarios depending on the driving directions of transmitting (Tx) and receiving (Rx) vehicles and the directions of transmission (Tx) and reception (Rx) beams.
Figure 10:
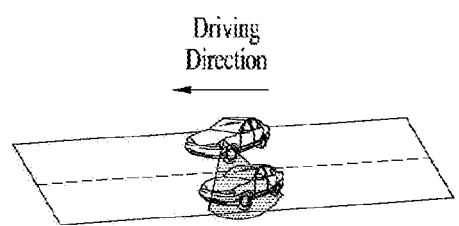
Figure 10:
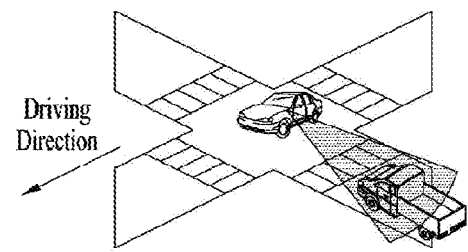
Figure 10:
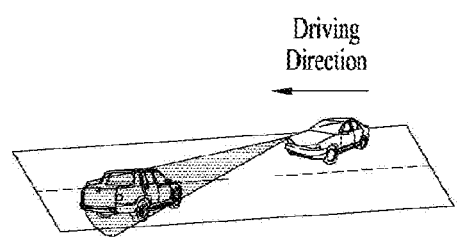

FIG. 10 is a diagram illustrating scenarios depending on the driving directions of transmitting (Tx) and receiving (Rx) vehicles and the directions of transmission (Tx) and reception (Rx) beams.

It is necessary to understand various V2V scenarios for better understanding of the Doppler effects caused by the movement of Tx and Rx vehicles among many other characteristics. FIG. 10 (a) shows a scenario in which Tx and Rx vehicles move at a distance, and FIG. 10 (b) shows a scenario in which Tx and Rx vehicles move side by side. FIG. 10 (c) shows a scenario in which the driving directions of Tx and Rx vehicles are quite different from each other (at an intersection), and FIG. 10 (d) shows a scenario in which the driving directions of Tx and Rx vehicles are completely different from each other.

The scenario of FIG. 10 (a) is expected to be the smallest V2V Doppler effect. In this scenario, the driving direction of the Tx vehicle is almost same as the direction of the Tx beam, or the angle therebetween is about 180 degrees if the front vehicle is the Tx vehicle. That is, although θ (i.e., an angle between the driving direction of the Rx vehicle and the direction in which a ray is received) in the Doppler effect formula $$\left( f_c \frac{v \cos\theta}{c} \right)$$

is about 0 or 180 degrees, a relative speed between the Tx and Rx vehicles, $|v|=|v_t-v_r|$ has a small value. Thus, the Doppler effect may be small. In other words, this scenario may have a large coherent time compared to the other scenarios.

The scenario of FIG. 10 (b) is expected to have a small relative Doppler effect if the Tx and Rx vehicles move at the almost same speed. On the other hand, if the speed difference between the Tx and Rx vehicles is large (a scenario in which the Tx or Rx vehicle overtakes the other), the relative speed increases. However, since θ is about 90 or −90 degrees, the Doppler effect is expected to be small. In the scenario of FIG. 10 (c), the driving directions of the Tx and Rx vehicles are quite different from each other (about 90 degrees) and the relative speed therebetween is also large (a scenario in which one of the Tx and Rx vehicles is almost stationary). That is, it may be considered as a scenario in which the Tx vehicle transmits a signal to the Rx vehicle that is almost stationary while moving or a scenario in which the Rx vehicle receives a signal from the Tx vehicle that is almost stationary while moving. In the former case, the direction in which the Rx vehicle receives a beam and the driving direction of the Rx vehicle may be observed to be opposite to the driving direction of the Tx vehicle due to the movement of the Tx vehicle. Thus, θ may be about 90 or −90 degrees, and the Doppler effect is expected to be small. However, considering that the relative speed increases in proportion to the speed of the Tx vehicle, the Doppler effect may increase. The scenario of FIG. 10 (d) is expected to have the largest Doppler effect. In this scenario, θ is about 0 or 180 degrees, and the relative speed is almost equal to the sum of the speeds of the Tx and Rx vehicles. Thus, the coherent time is expected to be extremely small. The coherent times of the scenarios of FIG. 10 may be as follows: (b)≥(a)≥(c)≥(d).

The mechanical beam steering performance of a directional antenna may be closely connected to a beam pointing error in V2V Tx and Rx links. That is, the mechanical beam steering performance may refer to capability of adjusting a Tx and Rx beam pair when the Tx and Tx beam pair is distorted. Since this capability is hardware performance, each vehicle may have different beam steering performance. However, the features thereof may be similar to each other depending on the beamwidth.

Figure 11:
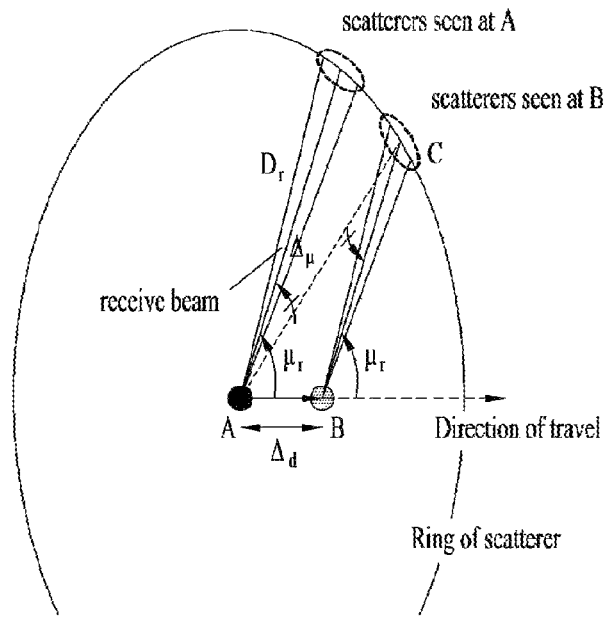
FIG. 11 is a diagram illustrating an angle between the driving direction of a vehicle and a scatterer and a relationship between a beamwidth and a coherent time (in consideration of a beam pointing error).
Figure 11:
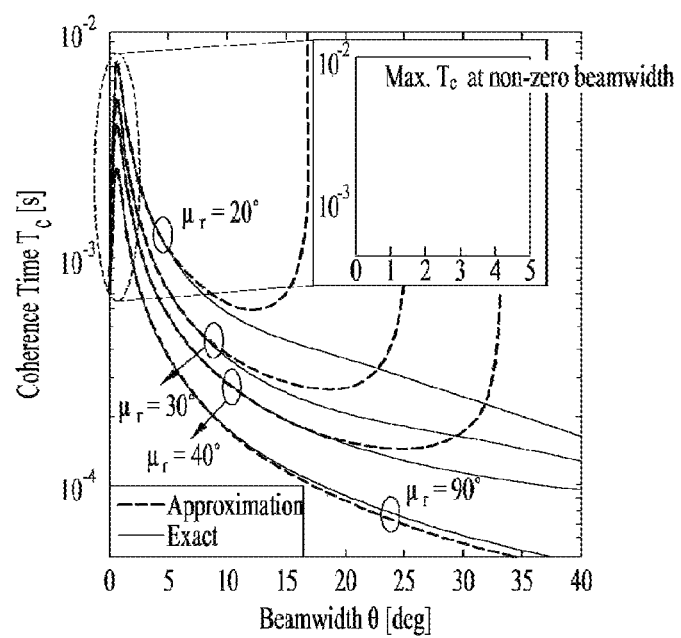

FIG. 11 is a diagram illustrating an angle between the driving direction of a vehicle and a scatterer and a relationship between a beamwidth and a coherent time (in consideration of a beam pointing error).

Specifically, FIG. 11 (a) shows the angle between the vehicle and scatterer depending on the displacement of a receiver, and FIG. 11 (b) shows the relationship between the beamwidth and the coherent time.

In FIG. 11, an angle between a specific Rx beam and the driving direction of an Rx vehicle, $\mu_r$ is defined to be less than or equal to 90°. As $\mu_r$ increases, the coherent time decreases. Even when the Rx vehicle moves a short distance, Rx rays with a large value of $\mu_r$ are likely to pass through different scatterers and then be received. On the other hand, even when the vehicle moves, Rx rays with a small value of $\mu_r$ are likely to pass through similar scatterers. Thus, the coherent time may increase. In the case of the beamwidth, as the beamwidth decreases, more accurate beam steering is required. In this case, the coherent time between links may decrease due to the beam pointing error. If the Rx beamwidth increases such that the beam pointing error is compensated for in terms of vehicle hardware, the coherent time may increase. However, if the beamwidth continues to increase, it may be interpreted to mean that more Doppler-shifted rays are received, and thus, the coherent time may decrease.

Figure 12:
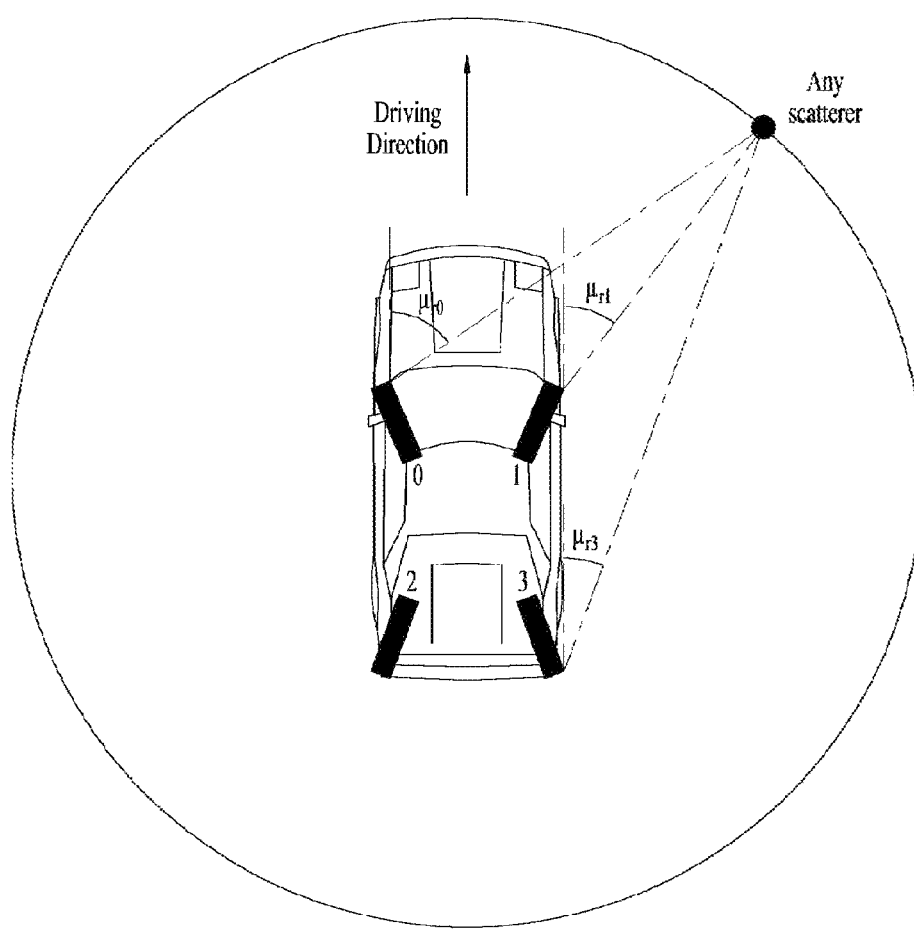
FIG. 12 is a diagram illustrating a relationship between a distributed antenna beam of a vehicle and a scatterer.

FIG. 12 is a diagram illustrating a relationship between a distributed antenna beam of a vehicle and a scatterer.

Based on the assumption that the distributed antenna of the vehicle is deployed as shown in FIG. 12, a coherent time relationship will be described. Although it is better to consider more scatterers (as the surrounding environment of the vehicle), the relationship with a specific scatterer will be described. Assuming that the Rx beam direction of each vehicle is towards a specific reference scatterer, angles between RX beams and vehicle driving directions may be defined as $\mu_{r0}$, $\mu_{r1}$, $\mu_{r2}$, and $\mu_{r3}$ for distributed Rx antennas 0, 1, 2, and 3. In this case, considering the Rx beamwidth of each Rx beam, each ray may be received in the vicinity of the angle. It is assumed that each of $\mu_{r0}$, $\mu_{r1}$, and $\mu_{r3}$ is the line of sight (LoS) at the scatterer as shown in FIG. 12 and each vehicle is sufficiently away from the scatterer. Since the characteristics of channels received on antennas 0, 1, and 3 through the scatterer are similar to each other at $\mu_{r0}$, $\mu_{r1}$, and $\mu_{r3}$, coherent times are also expected to be similar. The coherent times may be changed depending on the presence of other scatterers (for example, whether there are scatterers (e.g., other vehicles) in the vicinity thereof) and the movement speeds of Tx and Rx vehicles.

When distributed antennas are located close to each other, if beams are towards a specific scatterer and a distance between the scatterer and a Rx vehicle is greater than or equal to a predetermined value, the antennas may have similar coherent times. If the scatterer is replaced with a Tx vehicle, the above-described features may be considered as the features of each distributed Rx antenna and a transmission and reception link.

The relative Doppler characteristics may vary depending on the location of each distributed Tx/Rx antenna of a specific vehicle. For example, when independent link pairs: RU set 1 and RU set 2 are configured by the system as shown in FIG. 7, each link may have a different relative Doppler effect depending on which Tx RUs are connected to RU set 1 and RU set 2. The parameters shown in Table 5 may need to be considered in estimating a relationship between relative Doppler effects and distributed Tx/Rx antennas of a vehicle.

TABLE 5

(1) Angle between Tx beam direction of Tx RU and driving direction of Tx vehicle
(2) Angle between Rx beam direction of Rx RU and driving direction of Rx vehicle
(3) Bandwidth of Tx RU
(4) Bandwidth of Rx RU
(5) Beam misalignment (beam pointing error) depending on movement of Tx/Rx vehicle
(6) Relative velocity difference between Tx and Rx vehicles
(7) Distance between Tx and Rx vehicles The channel characteristics between Tx and Rx inks of vehicles may be estimated to have similar coherent times if the following conditions: a distance between distributed Rx antennas, similarity between Rx beam directions, similarity between beamwidths, and a sufficient distance between Tx and Rx vehicles are satisfied. When quasi co-location (QCL) (e.g., similarity between coherent times) is recognized based on the channel characteristics, the (transmission) periodicities of RSs (CSI-RS, SRS, DMRS, etc.) transmitted for sidelink channel estimation or CSI acquisition may be configured for each distributed Rx antenna. In addition to the RS transmission periodicity, an RS subframe or a slot offset value may be configured.

That is, a numerology, an RS transmission periodicity, etc. may be efficiently configured based on the channel characteristics of each distributed Rx antenna. An Rx vehicle may measure the channel characteristics of each distributed Rx antenna from synchronization signals transmitted from a Tx vehicle and then transmit the measured channel characteristics as capability information about each distributed antenna when a sidelink uplink is established (for example, using a RACH). Accordingly, signaling for dynamically changing each sidelink downlink based on the capability of each distributed antenna after establishment of the sidelink downlink based on a certain default numerology may be considered.

Figure 13:
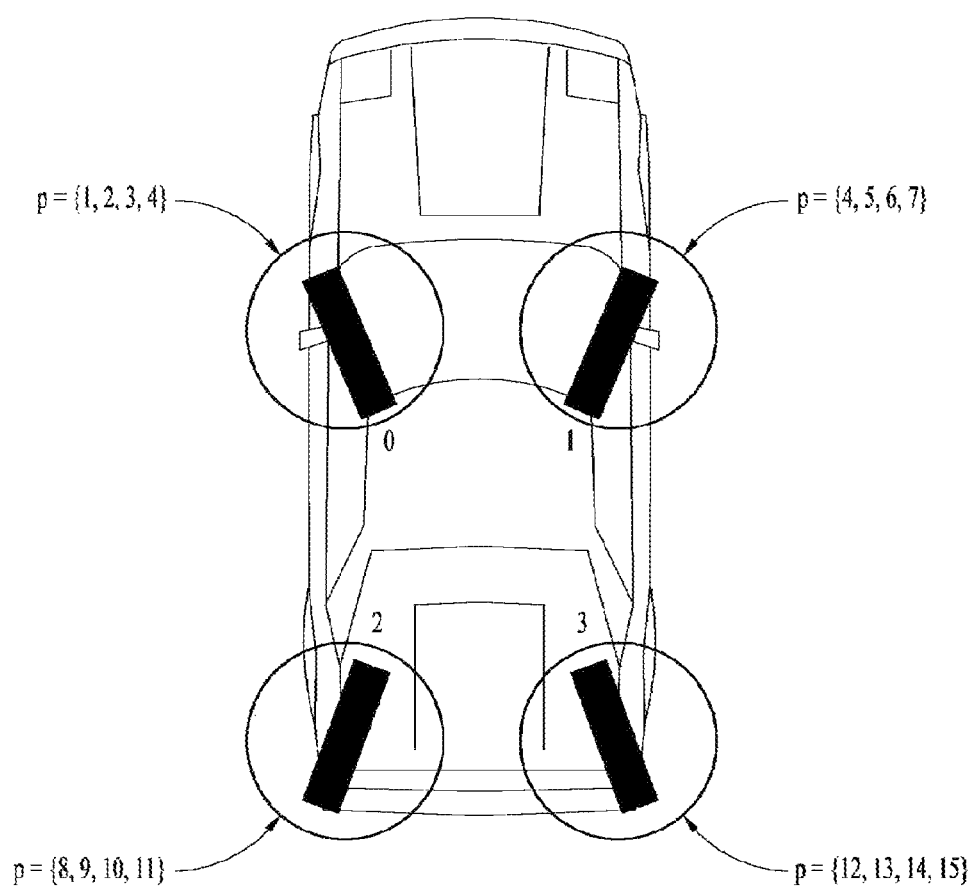
FIG. 13 is a diagram illustrating the indices of ports in a vehicle.

FIG. 13 is a diagram illustrating the indices of ports in a vehicle.

In the present disclosure, beams on distributed Tx antennas are represented by a port combination (e.g., {0, 1, 2, . . . , 15}) and/or the total number of RS resources as shown in FIG. 13, instead of representing the beams using a distributed antenna index and a port index corresponding thereto. Distributed antennas of a vehicle are connected to a control unit of the vehicle. In this case, each distributed antenna of the vehicle may represent as a port or resource a link between distributed antennas of Tx and Rx vehicles.

It is assumed that Rx beams on distributed Rx antennas of Rx vehicles may be respectively coupled to Tx beams on distributed Tx antennas of connected Tx vehicles as the best links. Alternatively, it is assumed that reception may be performed by applying a spatial filter in the direction of an omni-beam or in the direction of the best link thereof. In addition, it is assumed that there is no polarization between distributed Tx and Rx antennas of a vehicle (the antenna pole is static in time). Further, a port combination may be used as shown in FIG. 13, instead of using a distributed antenna index.

An Tx vehicle may transmit an SRS for sidelink beam management to provide information on beams of each RU unit thereof. In this case, from the perspective of the Tx vehicle, SRSs for the sidelink beam management transmitted on individual RUs may be frequency division multiplexed or time division multiplexed. The location of a resource for the sidelink SRS may be transmitted/configured by a BS through higher layer signaling. Alternatively, the resource may be fixed to a symbol in a sidelink time interval (e.g., a sidelink subframe) in advance. In the case of an idle UE, the location of the resource for the sidelink SRS may be preconfigured in a specific frequency/time region within a resource pool. Thus, an Rx vehicle may obtain information on the beams of each RU of the Tx vehicle by performing measurement on the sidelink SRS resource. The information on the beams of each RU of the Tx vehicle may be represented as an SRS resource indicator (SRI) for the sidelink SRS. If the Tx vehicle transmits the sidelink SRS by applying a cyclic shift to a Tx antenna port, the information on the beams of each RU of the Tx vehicle may be represented as an identifier (ID).

As an SRS operation for the sidelink beam management, U1/U2/U3 (Tx/Rx RU sweeping/Tx RU sweeping only/Rx RU sweeping only) may be applied to each RU. This operation configuration may be configured by higher layer signaling or transmitted in a message on a discovery channel in the resource pool (e.g., physical sidelink discovery channel (PSDCH). Alternatively, the Rx vehicle may identify U1, U2, and U3 by detecting the sequence of a sidelink synchronization signal (e.g., primary D2D synchronization signal (PD2DSS), secondary D2D synchronization signal (SD2DSS), etc.). The configuration of the SRS operation for the sidelink beam management may be included in a scheduling assignment (SA) message. The number of sidelink SRS resources M, which corresponds to the number of beams of each RU, may be configured by the higher layer, and the sidelink SRS resource is predefined to have fixed locations in the resource pool. For example, when M SRS resources are time division multiplexed (TDMed) for one RU, M symbols are configured from the last symbol in a predetermined sidelink time interval (e.g., sidelink subframe). When the M SRS resources are TDMed for each of K RUs, K*M symbols are configured from the last symbol in the predetermined sidelink time interval (e.g., sidelink subframe). The SRS operation in the resource pool may be configured periodically/aperiodically/semi-persistently for each predetermined sidelink time interval (e.g., sidelink subframe). A sidelink SRS sequence may be configured in the form of an LTE SRS sequence (e.g., a root (i.e., a combination of a group hopping number u and a sequence number v), a transmission combination (TC), CS, TC offset, etc.).

According to the present disclosure, a Tx vehicle may receive feedback information including QCL information from an Rx vehicle and transmit a sidelink signal to the Rx vehicle in each Rx RU group of the Rx vehicle based on the feedback information. In this case, the Rx vehicle may turn off other RU groups except a corresponding RU group (for power saving) or apply the SDD thereto together with RUs of another vehicle.

Proposal 1

Figure 14:
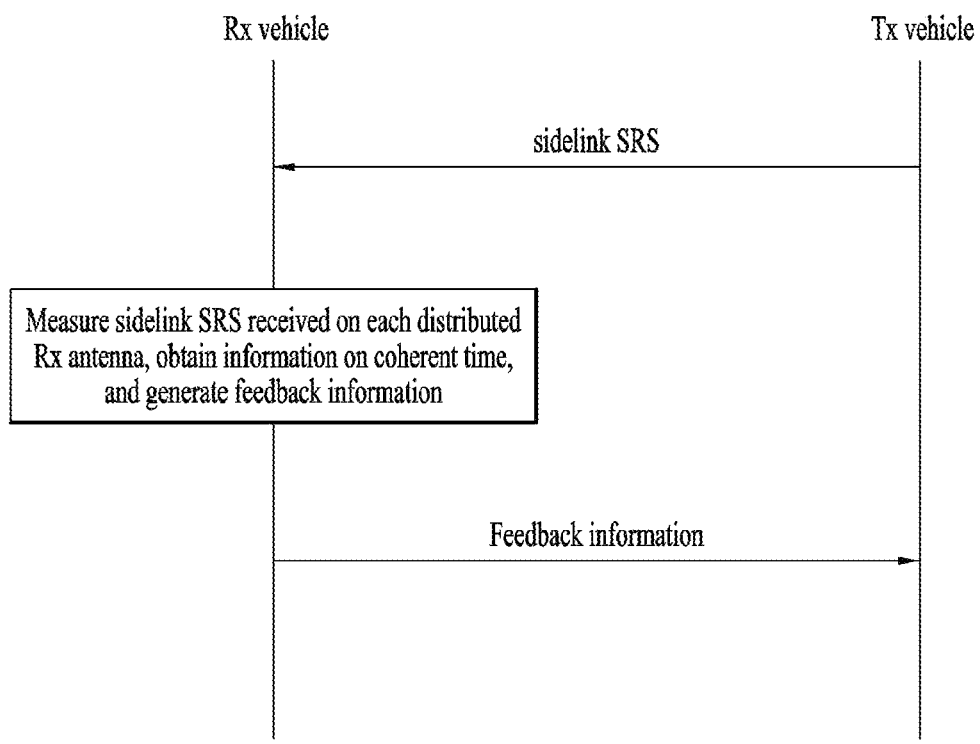
FIG. 14 is a diagram for explaining Proposal 1 of the present disclosure.

FIG. 14 is a diagram for explaining Proposal 1 of the present disclosure.

Referring to FIG. 14, an Rx vehicle may receive an SRS on each distributed antenna through a sidelink from a Tx vehicle. The Rx vehicle may measure the sidelink SRS received on each distributed Rx antenna, compile the statistics of measurements, and then obtain information on QCL between individual distributed antennas of the Tx vehicle (e.g., similarity in coherent times between the individual distributed antennas). The Rx vehicle may transmit feedback information on the distributed antennas thereof through the sidelink to the Tx vehicle. The feedback information may include the QCL information.

Thus, the feedback information may include an SRI and information on a QCL relationship between RUs (e.g., information on coherent times). Here, the SRI may contain information on a resource corresponding to an SRS with the best measurement among SRS measurements measured by the Rx vehicle (or a resource on which the SRS is transmitted). The QCL information between RUs may be represented by association with the SRI. That is, an SRS resource may be predefined for each RU or distributed antenna. Thus, when a vehicle measures an SRS on an SRS resource, an RU or distributed antenna used for transmission of the SRS may be detected. As described above, the SRS resource may be associated with the RU or distributed antenna.

Referring to Table 6, it may be considered as an example of the association with the SRI that among SRS resources, an SRS corresponding to SRI 0 is an SRS with the best measurement (e.g., an SRS with the highest reference signal received power (RSRP). The Rx vehicle may transmit to the Tx vehicle feedback information including one of the following values: "00", "01", "10", and "11", which is the index of QCL between RUs. For example, when the value of "10" is indicated, it may mean that a combination of SRI 0 with the best measurement and SRI 3 has the most similar coherent times. Table 6 be shared by the vehicles in advance.

TABLE 6

| QCL index between RUs (or distributed antennas) when SRI is SRI 0 | QCL relationship combination |
| --- | --- |
| 00 | (SRI 0, SRI 1) |
| 01 | (SRI 0, SRI 2) |
| 10 | (SRI 0, SRI 3) |
| 11 | (SRI 0, SRI 2, SRI 3) |

The Tx vehicle that transmits the sidelink SRS may inform a target vehicle of its temporary unique vehicle ID and a resource for feedback in the resource pool. To this end, for example, a PSDCH may be used. The target vehicle may scramble the feedback information with the temporary unique vehicle ID (e.g., cell ID) of the vehicle that transmits the sidelink SRS and then transmit the feedback information on the resource in the resource pool, which is indicated by the vehicle that transmits the sidelink SRS.

Proposal 1-1

Feedback information may be represented by distinguishing QCL stages between Tx antenna RUs. An SRI, SRS port ID, and/or CS for indicating a sidelink SRS resource may be transmitted in the feedback information. Assuming that a Tx vehicle has four distributed RU indices, the Tx vehicle may perform transmission based on the distinguishment shown in Table 7. Table 7 be shared by the vehicles in advance.

TABLE 7

| Feedback information (QCL index) (related to coherent time) | Distributed antenna set with similar coherent time |
|---|---|
| 0 | {1, 2} |
| 1 | {1, 3} |
| 2 | {1, 4} |
| 3 | {2, 3} |
| 4 | {2, 4} |
| 5 | {3, 4} |
| 6 | {1, 2, 3} |
| 7 | {1, 2, 4} |

For example, referring to Table 7, when the RX vehicle provides feedback of QCL index 2 to the Tx vehicle, this may mean that distributed port index set {1,4} is a distributed antenna set with similar coherent times.

Proposal 1-2

According to the feedback structure in Proposal 1, a Tx vehicle may explicitly provide a measurement to an Rx vehicle. Thus, information indicating which Rx RU a corresponding coherent time is for may be included in feedback information. In other words, the feedback information may contain the information indicating which Rx RU the corresponding coherent time is for together with an SRI and/or an SRS port ID. Assuming that the Rx vehicle has four distributed antenna indices, the Rx vehicle may transmit the feedback information based on the distinguishment shown in Table 8. Table 8 be shared by the vehicles in advance.

TABLE 8

| Feedback index | Coherent time range |
|---|---|
| 0 | 0~10 ns |
| 1 | 10~50 ns |
| 2 | 50~100 ns |
| 3 | 100~200 ns |
| 4 | 200~500 ns |
| 5 | 500~1000 ns |
| 6 | 1~5 us |
| 7 | 5 us or higher |

For example, referring to Table. 8, when the Rx vehicle transmits the feedback information to the Tx vehicle by including feedback index 1, the Tx vehicle may know that the coherent time is in the range of 10 to 50 ns. With continued reference to Table 8, if the coherent time of a distributed antenna with index 3 at the Rx vehicle is about 70 ns, the Rx vehicle may transmit the feedback information to the Tx vehicle by including two bits ('10') for indicating the distributed antenna index thereof and three bits ('0010' which corresponds to feedback index 2) for indicating the coherent time range.

Proposal 1-3

According to Proposal 1, feedback information may include information about link capability required when transmission and reception is performed in each Rx RU through each sidelink. Table 9 shows that information on the capabilities of links between distributed Tx and Rx antennas of Tx and Rx vehicles is represented by numerologies. Table 9 be shared by the vehicles in advance.

TABLE 9

| (Link capability) | Numerology Recommendation (represented by SCS) |
|---|---|
| 0 | 15 kHz |
| 1 | 30 kHz |
| 2 | 60 kHz |
| 3 | 120 kHz |

For example, referring to Table 9, when link capability 1 is fed back, an SCS of 30 Hz is indicated as the numerology recommendation.

Table 10 shows that information on the capabilities of links between distributed Tx and Rx antennas of Tx and Rx vehicles is represented by combinations of beam indices and beamwidths of individual sidelinks. Table 10 be shared by the vehicles in advance.

TABLE 10

| Link capability | Rx beamwidth | Link capability (beam index) | Beam index |
|---|---|---|---|
| 0 | 0~10 degrees | 0 | 0 |
| 1 | 10~30 degrees | 1 | 1 |
| 2 | 30~50 degrees | 2 | 2 |
| 3 | 50~90 degrees | 3 | 3 |

For example, referring to Table 10, when link capability 1 is fed back, it may indicate an Rx beamwidth of 10 to 30 degrees and beam index 1.

Proposal 1-6

According to proposal 1, feedback information may include an offset value with respect to a value corresponding to QCL capability of a primary distributed antenna (e.g., a numerology, an Rx beamwidth, a beam index, an angle between the driving direction of an Rx vehicle and an Rx beam, etc.). Table 11 shows that information on the capabilities of links between Tx and Rx RUs of Tx and Rx vehicles is represented by combinations of beamwidth differences of individual sidelinks with respect to the capability of a primary distributed antenna and angle differences between the driving directions of an Rx vehicle and Rx beams. Table 11 be shared by the vehicles in advance.

TABLE 11

| Link capability (beamwidth difference) | Rx beamwidth difference with respect to primary distributed antenna | Link capability (beam direction difference) | Beam direction difference with respect to primary distributed antenna |
|---|---|---|---|
| 0 | 0~10 degrees difference | 0 | 0~5 degrees difference |
| 1 | 10~30 degrees difference | 1 | 5~20 degrees difference |
| 2 | 30~50 degrees difference | 2 | 20~40 degrees difference |
| 3 | 50~90 degrees difference | 3 | 40~90 degrees difference |

For example, referring to Table 11, when link capability 1 is fed back, it may mean that the Rx beamwidth difference with respect to the primary distributed antenna is 10 to 30 degrees and the beam direction difference with respect to the primary distributed antenna is 5 to 20 degrees.

Proposal 1-7

An Rx vehicle may allow to identify QCL by feeding back the resource indices of received sidelink SRSs.

Figure 15:
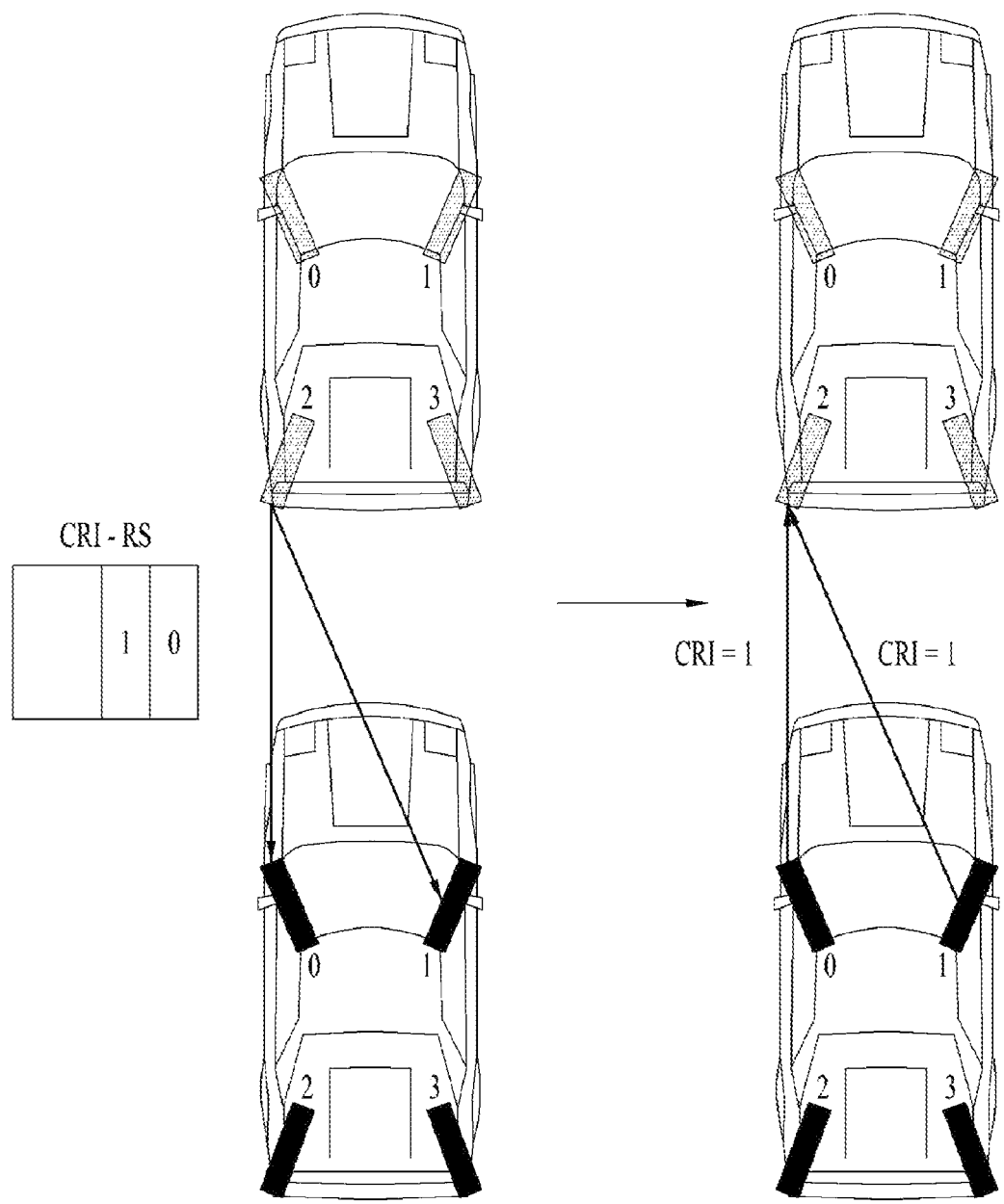
FIG. 15 is a diagram illustrating transmission of a channel state information reference signal (CSI-RS) resource indicator (CRI) associated with a CSI-RS transmitted on one distributed antenna.

FIG. 15 is a diagram illustrating transmission of a channel state information reference signal (CSI-RS) resource indicator (CRI) associated with a CSI-RS transmitted on one distributed antenna.

It is assumed that a CSI-RS is configured as shown in FIG. 15 and a CRI (indicating a resource on which the CSI-RS is transmitted) received in one RU of a Tx vehicle is transmitted from each Tx RU of an Rx vehicle. If CRI 1 is transmitted on RUs 0 and 1 of the Rx vehicle that will receive the CSI-RS, two coherent times may be determined to be similar to each other. In this case, each bandwidth is assumed to be similar or the same. In addition, it is assumed that the CSI-RS is transmitted on one distributed Tx antenna at a CSI-RS transmission instance.

Proposal 1-8

Method for Rx Vehicle to Receive Feedback Information

Figure 16:
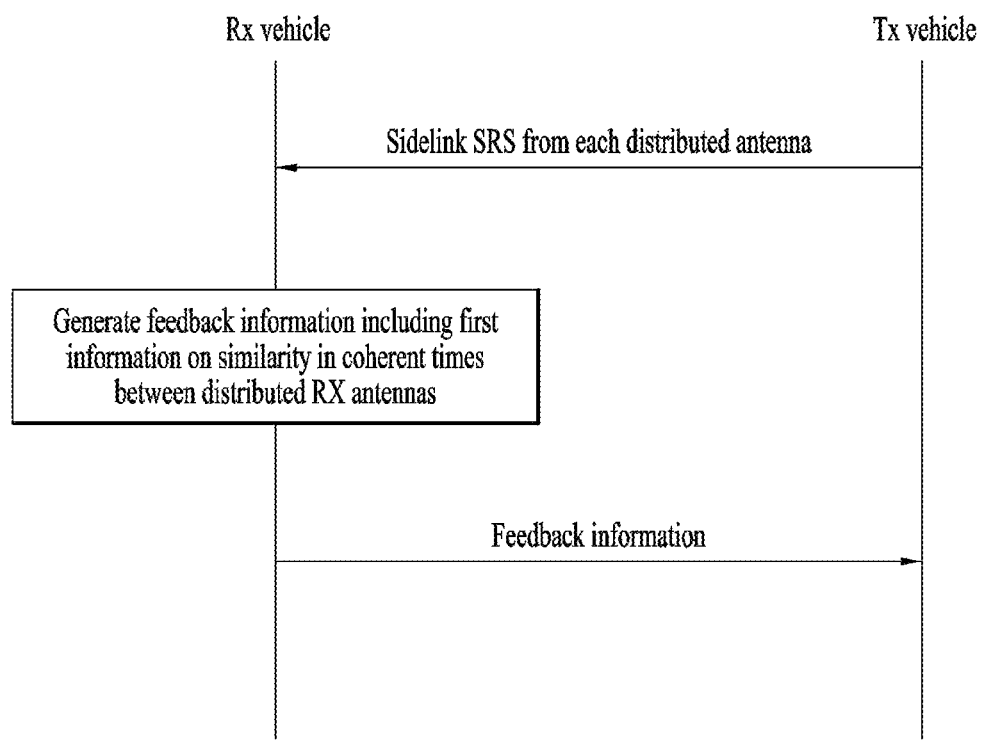
FIG. 16 is a diagram illustrating a procedure in which an Rx vehicle transmits feedback information according to Proposal 1-8 of the present disclosure.

FIG. 16 is a diagram illustrating a procedure in which an Rx vehicle transmits feedback information according to Proposal 1-8 of the present disclosure.

Referring to FIG. 16, the Rx vehicle may receive sidelink SRSs through individual distributed Rx antennas from a Tx vehicle. The Rx vehicle may measure the sidelink SRSs received through the individual distributed Rx antennas and then generate first information on similarity in coherent times between the individual distributed Rx antennas. The Rx vehicle may include the first information in the feedback information and then transmit the feedback information to the Tx vehicle.

Upon receipt of the sidelink SRSs, the Rx vehicle may generate the first information about grouping of Rx vehicle's RUs (or distributed antennas) having similarity in time coherency. The Rx vehicle may include information on a configured RU group in the feedback information and then transmit the feedback information to the vehicle transmitting the sidelink SRSs. Alts 1, 2, and 3 may be included in the feedback information.

Alt 1. Information on an RU index group (group ID)

Alt 2. An SRI and the number of RUs having similarity in coherent times with the SRI (the similarity is greater than or equal to a predetermined threshold) (similar to rank)

Alt 3. An SRI, an SRS port, the number of RUs having similarity in coherent times with the SRI port (rank+port selection), and a CS value (the CS value may indicate or identify the SRS port)

The Rx vehicle may include an indication for requesting the Tx vehicle to transmit sidelink RSs with the same periodicity for RU groups with similarity in time coherency in the feedback information and then transmit the feedback information to the Tx vehicle.

Figure 17:
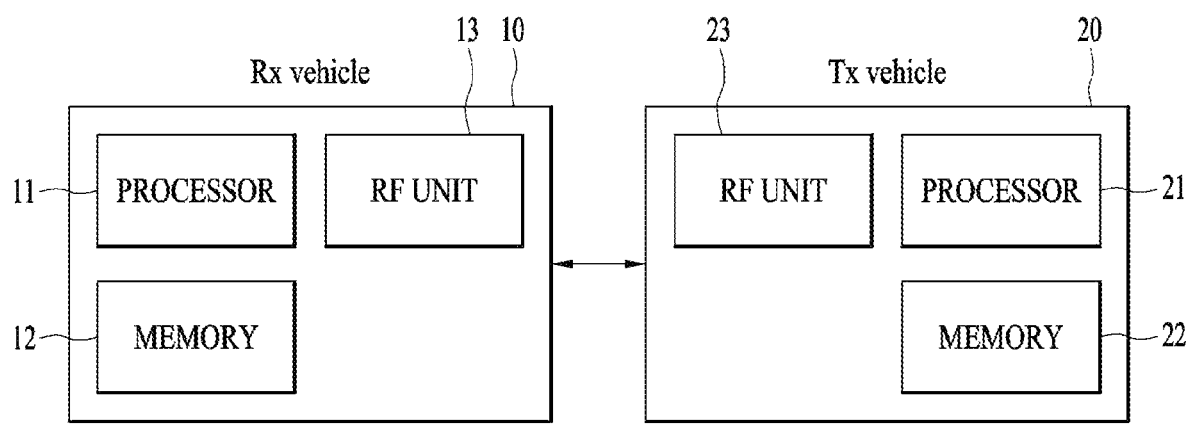
FIG. 17 is a block diagram illustrating an Rx vehicle for transmitting feedback information and a Tx vehicle for receiving the feedback information according to Proposal 1-8 of the present disclosure.

FIG. 17 is a block diagram illustrating an Rx vehicle for transmitting feedback information and a Tx vehicle for receiving the feedback information according to Proposal 1-8 of the present disclosure.

Referring to FIG. 17, a receiver 13 of the Rx vehicle may be configured to receive sidelink SRSs through individual distributed Rx antennas from the Tx vehicle. A processor 11 of the Rx vehicle may be configured to measure the sidelink SRSs received through the individual distributed Rx antennas and then generate first information on similarity in coherent times between the individual distributed Rx antennas. A transmitter 13 of the Rx vehicle may be configured to transmit the feedback information including the first information to the Tx vehicle.

Figure 18:
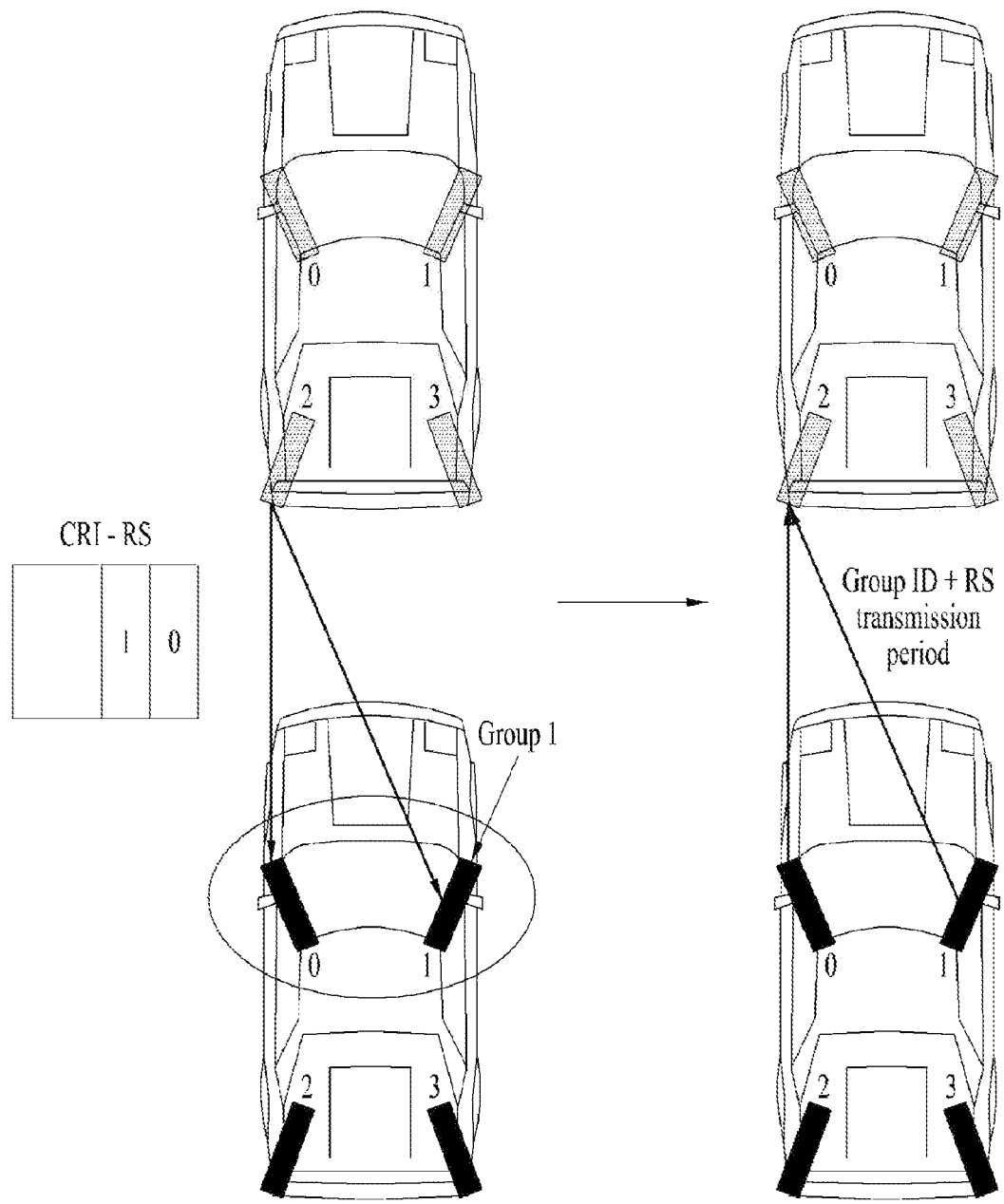
FIG. 18 is a diagram illustrating a group ID and a reference signal (RS) transmission periodicity associated with a CSI-RS transmitted on one distributed antenna.

FIG. 18 is a diagram illustrating a group ID and an RS transmission periodicity associated with a CSI-RS transmitted on one distributed antenna.

Referring to FIG. 18, when the indices of distributed Rx antennas having similar time coherency for SRI 0 are {0,1}, an Rx vehicle with distributed Rx antennas may group distributed Rx antenna 0 and 1 (i.e., distributed Rx antennas {0,1}) into group 1 for reception thereof and then configure the RS transmission periodicity of group 1. Thereafter, the Rx vehicle may transmit the ID of the group and the RS transmission periodicity to a Tx vehicle.

Proposal 2

Method for Tx Vehicle to Receive Feedback Information

Figure 19:
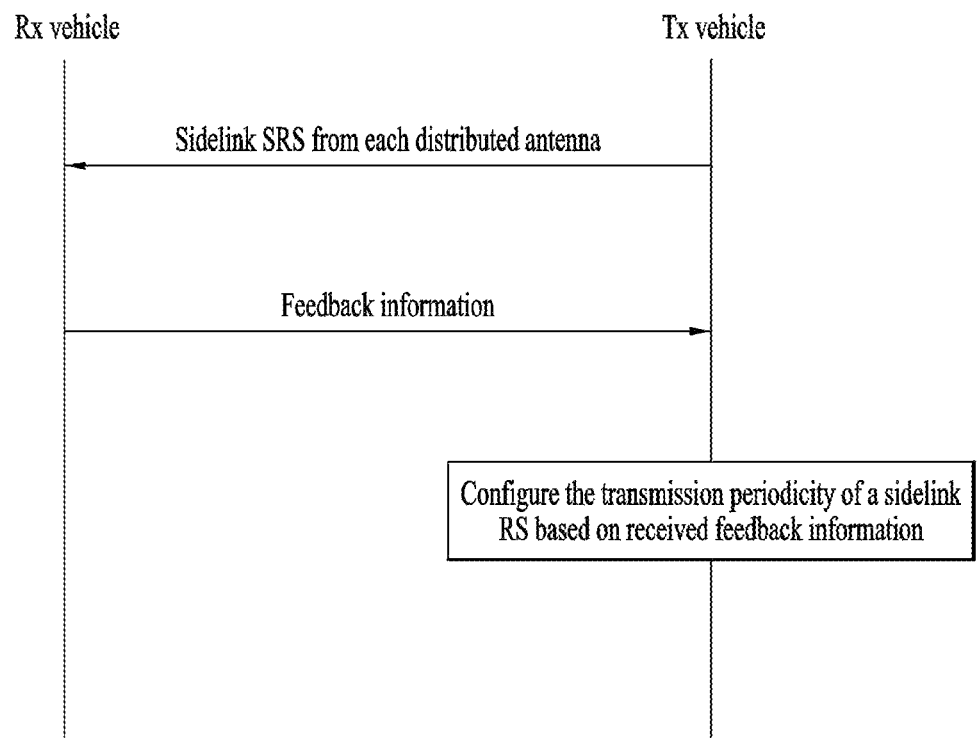
FIG. 19 is a diagram illustrating a procedure in which a Tx vehicle receives feedback information according to Proposal 2 of the present disclosure.

FIG. 19 is a diagram illustrating a procedure in which a Tx vehicle receives feedback information according to Proposal 2 of the present disclosure.

Referring to FIG. 19, the Tx vehicle may transmit sidelink SRSs through individual distributed Tx antennas to an Rx vehicle. The Tx vehicle may receive from the Rx vehicle feedback information including first information on similarity in coherent times between individual distributed Rx antennas of the Rx vehicle. The Tx vehicle may configure the transmission periodicities of the sidelink SRSs based on the feedback information. The first information may include distributed Rx antenna grouping information on grouping of distributed Rx antennas of the second moving object having similarity in coherent times greater than or equal to a predetermined threshold, and the configuration step may include configuring the same SRS transmission periodicity for the same distributed Rx antenna group. The configuration step may further include configuring transmission periodicities for different receive antenna groups such that the transmission intervals of the sidelink SRSs do not overlap with each other in the time domain Tx Vehicle for Receiving Feedback Information A transmitter (23) of the Tx vehicle may be configured to transmit sidelink SRSs through individual distributed Tx antennas to the Rx vehicle. A receiver 23 of the Tx vehicle may be configured to receive, from the Rx vehicle, feedback information including first information on similarity in coherent times between individual distributed Rx antennas of the Rx vehicle. A processor 21 of the Tx vehicle may be configured to configuring the transmission periodicities of the sidelink SRSs based on the feedback information. The processor 23 of the Tx vehicle may be configured to configure transmission periodicities for different receive antenna groups such that the transmission intervals of the sidelink SRSs do not overlap with each other in the time domain.

As described above, a Tx vehicle may configure the transmission periodicity of a sidelink RS transmitted on each distributed antenna of an Rx vehicle based on feedback information (i.e., information on similarity between coherent times) received from the Rx vehicle. Such a reference signal may include a sidelink CSI-RS, a downlink DMRS, a sidelink SRS, or an uplink DMRS. The transmission periodicity may be transmitted by higher layer signaling (e.g., RRC signaling) for static transmission, transmitted by L1 signaling (e.g., downlink control information (DCI)) for dynamic transmission, or transmitted by L2 signaling (e.g., MAC-CE) for semi-static transmission. The transmission periodicity may be considered as an RS periodicity in a resource pool or a time region for transmitting a sidelink resource. In this case, an RS subframe or a slot offset value may be transmitted together with the RS transmission period.

For example, when feedback information received on a distributed Rx antenna of the Tx vehicle, which is associated with a distributed Tx antenna thereof, indicates CRI 0 and CRI 2 for distributed Rx antennas {0, 1} of the Rx vehicle, respectively, the Tx vehicle may set the RS periodicity for distributed Rx antenna 0 of the Rx vehicle to one slot and set the RS periodicity for distributed Rx antenna 1 of the Rx vehicle to two slots. This may mean that distributed Rx antennas 0 and 1 have different spatial channel characteristics. In general, the periodicity of a channel estimation RS for a distributed Tx/Rx antenna link may be set to be proportional to a coherent time. For example, each of $\alpha \cdot \tau_c$ and $\alpha$ may be a specific integer.

Figure 20:
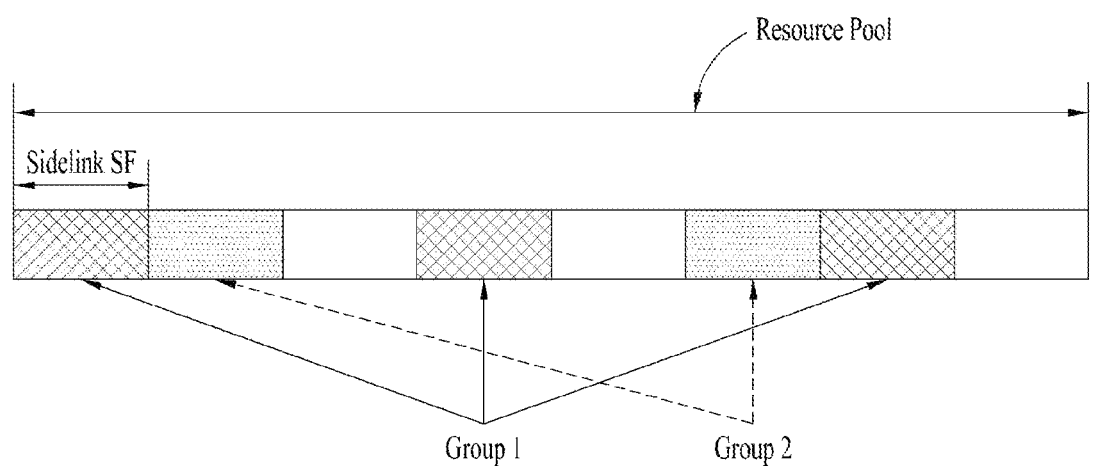
FIG. 20 is a diagram illustrating transmission periodicities and time regions for sidelink time intervals of groups in a resource pool.

FIG. 20 is a diagram illustrating transmission periodicities and time regions for sidelink time intervals of groups in a resource pool.

Referring to FIG. 20, when group 1 has a periodicity of three sidelink time intervals (e.g., three sidelink subframes (SFs)) in the resource pool and group 2 has a periodicity of four sidelink time intervals (e.g., four sidelink SFs) in the same resource pool, the time resource region for an Rx vehicle in the resource pool may be determined as follows. In this case, it is assumed that sidelink time intervals (e.g., sidelink SFs) of one group may not collide with those of the other group.

Proposal 2-1

A Tx vehicle may group distributed antennas of an Rx vehicle based on feedback information (i.e., information on similarity between coherent times) and then configure the transmission periodicity of a sidelink RS for each group.

For example, when feedback information received on a distributed Rx antenna of the Tx vehicle, which is associated with a distributed Tx antenna thereof, indicates CRI 1 for distributed Rx antennas {0,1} of the Rx vehicle, if the Tx vehicle performs transmission on the corresponding distributed Tx antenna, the Tx vehicle may define distributed Rx antennas {0,1} of the Rx vehicle as group 1 and then set the RS periodicity of group 1 to one slot. Then, the Tx vehicle may transmit such configuration information. The grouping of distributed Rx antennas may be determined by the higher layer.

Proposal 2-2

The transmission periodicity of an RS for one group may be transmitted on a representative Tx/Rx antenna link of the group (i.e., a primary link of the group). In this case, periodicity offset values may be configured for the transmission periodicities of RSs on other links in the group, and information on the periodicity offset values may also be transmitted on the representative Tx/Rx antenna link of the group. The periodicity offset value may be configured by the higher layer (RRC) and explicitly indicated. Alternatively, the periodicity offset value may be implicitly estimated based on a distance between distributed antennas of the Rx vehicle.

For example, when that Rx antennas 2 and 3 of an Rx vehicle, which are associated with Tx antenna 1 of a Tx vehicle, are grouped into one group, if a primary link corresponds to Tx antenna 1 of the Tx vehicle and Rx antenna 2 of the Rx vehicle, periodicity offset values may be signaled as follows through higher layer (RRC) signaling. Table 12 below shows the periodicity offset values. Table 12 may be shared by the vehicles in advance.

TABLE 12

| RS transmission periodicity offset index | Periodicity offset value | Distance from primary antenna of group |
| --- | --- | --- |
| 0 | ½ slots/subframes | ~1 m |
| 1 | 1 slot/subframe | 2 m~3 m |
| 2 | 2 slots/subframes | 3 m~4 m |
| 3 | 3 slots/subframes | 4 m or longer |

As an implicit example, referring to Table 12, when the distance between Rx antennas 2 and 3 of an Rx vehicle is about 2.1 m, an offset of one slot may be present. If the RS periodicity of Rx antenna 2 of the Rx vehicle is $\Delta$, the RS periodicity of Rx antenna 3 of the Rx vehicle may be $\Delta+1$ slots/subframes.

As an explicit example, it is assumed that an explicit offset value of 2 is transmitted on the link of Rx antenna 2 of an Rx vehicle for Rx antenna 3 thereof. If the RS periodicity of Rx antenna 2 of the Rx vehicle is $\Delta$, the RS periodicity of Rx antenna 3 of the Rx vehicle may be $\Delta+2$ slots/subframes.

Proposal 2-3

A value for representing similarity in coherent times between different groups may be transmitted from a Tx antenna of an Rx vehicle to an Rx antenna of a Tx vehicle. The RS transmission periodicity for each group of the Rx vehicle may be configured by the Rx vehicle or a V2V BS based on K links among N links between antennas of the Tx vehicle and Rx antennas of the Rx vehicle (where K is selected in descending order of link quality). K=1 may mean the best link, and in this case, an offset value for representing a difference in similarity in coherent times between groups may be transmitted together.

Figure 21:
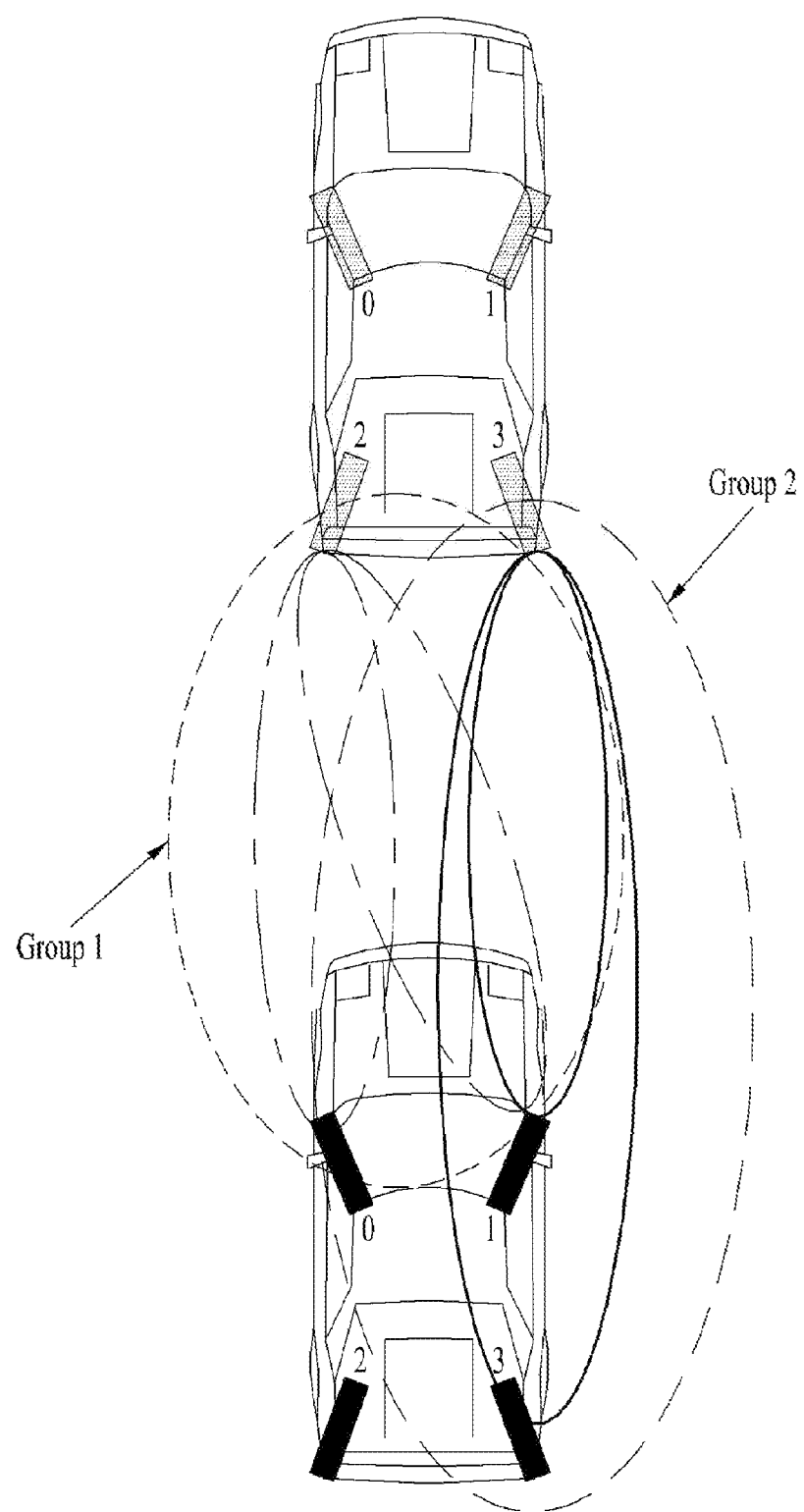
FIG. 21 is a diagram illustrating group classification based on similarity between quasi co-location (QCL) levels (similarity between coherent times).

FIG. 21 is a diagram illustrating group classification based on similarity between QCL levels (similarity between coherent times).

For example, referring to FIG. 21, a Tx beam on antenna 2 of a Tx vehicle and a link between Rx antennas 0 and 1 of an Rx vehicle may be set as group 1, and a Tx beam on antenna 3 of the Tx vehicle and a link between Rx antennas 2 and 3 of the Rx vehicle may be set as group 2. In this case, it is assumed that these groups have similar QCL levels. When a certain link in group 1 is the best link and thus set to the primary link, if DL and UL links are connected to each other, a QCL offset value with respect to links in group 1 may be transmitted to configure the RS transmission periodicity for links in group 2. For example, when the RS periodicity for the links in group 1 is one slot, if the QCL offset value follows offset index 1 in Table 12, the RS periodicity for the links in group 2 may be set to two slots.

Proposal 3

An RS port group or RS resource group may be established based on QCL, i.e., similar coherent times, and the RS transmission periodicity for the group may be transmitted through the best link (i.e., the primary link) in the corresponding port group or resource group. Transmission periodicity offset values for ports or resources having coherent times different from that of the best link in the group may be signaled via the best link. The periodicity offset values may be transmitted through higher layer (L3 or RRC) signaling, L2 (MAC-CE) signaling, and/or L1 (DCI) signaling.

Proposal 3-1

When resources for measurement at individual ports of a Tx vehicle are transmitted for RS port grouping or RS resource grouping for QCL between coherent times, if the RSRP, BLER, or SNR of a signal received by an Rx vehicle is less than a specific threshold, the Rx vehicle may not use sidelink ports or sidelink resources QCLed with corresponding ports or resources. That is, the Tx vehicle may provide an indication of sidelink ports or resources QCLed with ports or resources transmitted through DCI, MAC-CE, or RRC in addition to the measurement resources for the grouping. Thus, when grouping ports or resources, the Tx vehicle may implicitly exclude the ports or resources corresponding to links which are less than the specific threshold.

The above-described embodiments and proposals are achieved by combining elements and features of the present disclosure in prescribed forms. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method for transmitting and receiving feedback information and vehicle therefor may be industrially applied to various wireless communication systems including the 3GPP LTE/LTE-A system, the 5G communication system, etc.

The invention claimed is:

1. A method of transmitting feedback information by a first moving object, the method comprising:
receiving sidelink sounding reference signals (SRSs) through individual distributed receive antennas from a second moving object;
generating first information on similarity in coherent times between the individual distributed receive antennas by measuring the sidelink SRSs received through the individual distributed receive antennas; and
transmitting the feedback information including the first information to the second moving object.

2. The method of claim 1, wherein the first information comprises distributed receive antenna grouping information on grouping of distributed receive antennas having similarity in coherent times therebetween greater than or equal to a predetermined threshold.

3. The method of claim 2, wherein the feedback information further comprises information indicating that sidelink SRSs need to be transmitted with a same periodicity for a same distributed receive antenna group.

4. The method of claim 1, further comprising generating, based on the measurement, second information on an SRS resource on which a highest quality SRS is transmitted and a number of distributed receive antennas corresponding to SRS resources having similarity in coherent times with the SRS resource greater than or equal to a predetermined threshold, and wherein the feedback information further comprises the second information.

5. The method of claim 1, further comprising generating, based on the measurement, third information on an SRS port and an SRS resource on which a highest quality SRS is transmitted and a number of distributed receive antennas having similarity in coherent times with the SRS port greater than or equal to a predetermined threshold, and wherein the feedback information further comprises the third information.

6. A method of receiving feedback information by a first moving object, the method comprising:
transmitting sidelink sounding reference signals (SRSs) through individual distributed transmit antennas to a second moving object;
receiving, from the second moving object, feedback information including first information on similarity in coherent times between individual distributed receive antennas of the second moving object; and
configuring transmission periodicities of the sidelink SRSs based on the feedback information.

7. The method of claim 6, wherein the first information comprises distributed receive antenna grouping information on grouping of distributed receive antennas of the second moving object having similarity in coherent times greater than or equal to a predetermined threshold, and wherein the configuring comprises configuring a same SRS transmission periodicity for a same distributed receive antenna group.

8. The method of claim 7, wherein the configuring further comprises configuring transmission periodicities for different receive antenna groups such that transmission intervals of the sidelink SRSs do not overlap with each other in a time domain.

9. A first moving object for transmitting feedback information, the first moving object comprising:
a receiver configured to receive sidelink sounding reference signals (SRSs) through individual distributed receive antennas from a second moving object;
a processor configured to generate first information on similarity in coherent times between the individual distributed receive antennas by measuring the sidelink SRSs received through the individual distributed receive antennas; and
a transmitter configured to transmit the feedback information including the first information to the second moving object.

10. The first object of claim 9, wherein the first information comprises distributed receive antenna grouping information on grouping of distributed receive antennas having similarity in coherent times therebetween greater than or equal to a predetermined threshold.

11. The first object of claim 10, wherein the feedback information further comprises information indicating that sidelink SRSs need to be transmitted with a same periodicity for a same distributed receive antenna group.

12. The first object of claim 9, wherein the processor is configured to generate, based on the measurement, second information on an SRS resource on which a highest quality SRS is transmitted and a number of distributed receive antennas corresponding to SRS resources having similarity in coherent times with the SRS resource greater than or equal to a predetermined threshold, and wherein the feedback information further comprises the second information.

13. The first object of claim 9, wherein the processor is configured to generate, based on the measurement, third information on an SRS port and an SRS resource on which a highest quality SRS is transmitted and a number of distributed receive antennas having similarity in coherent times with the SRS port greater than or equal to a predetermined threshold, and wherein the feedback information further comprises the third information.

14. The first object of claim 9, wherein the first object is capable of communicating with at least one of another user equipment (UE), a UE related to an autonomous driving vehicle, the BS or a network.

15. A first moving object for receiving feedback information, the first moving object comprising:
 a transmitter configured to transmit sidelink sounding reference signals (SRSs) through individual distributed transmit antennas to a second moving object;
 a receiver configured to receive, from the second moving object, feedback information including first information on similarity in coherent times between individual distributed receive antennas of the second moving object; and
 a processor configured to configure transmission periodicities of the sidelink SRSs based on the feedback information.

16. The first object of claim 15, wherein the processor is configured to configure transmission periodicities for different receive antenna groups such that transmission intervals of the sidelink SRSs do not overlap with each other in a time domain.

17. The first object of claim 15, wherein the first moving object comprises a vehicle with a distributed antenna deployment structure.

18. The first object of claim 15, wherein the first object is capable of communicating with at least one of another user equipment (UE), a UE related to an autonomous driving vehicle, the BS or a network.

* * * * *